(12) United States Patent
Nakamura et al.

(10) Patent No.: US 11,873,443 B2
(45) Date of Patent: *Jan. 16, 2024

(54) COMPOSITION AND PRODUCTION METHOD OF SAME, AND DISPERSING AGENT

(71) Applicant: NIPPON PAPER INDUSTRIES CO., LTD., Kita-ku (JP)

(72) Inventors: Akihiko Nakamura, Tokyo (JP); Kanae Takahashi, Tokyo (JP); Takuma Nakamura, Tokyo (JP); Sumio Tamura, Tokyo (JP); Tubasa Kanenaka, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/265,399

(22) PCT Filed: Aug. 8, 2019

(86) PCT No.: PCT/JP2019/031511
§ 371 (c)(1),
(2) Date: Feb. 2, 2021

(87) PCT Pub. No.: WO2020/032216
PCT Pub. Date: Feb. 13, 2020

(65) Prior Publication Data
US 2021/0292632 A1 Sep. 23, 2021

(30) Foreign Application Priority Data

Aug. 9, 2018 (JP) .................. 2018-150844
Aug. 15, 2018 (JP) .................. 2018-152860
Aug. 20, 2018 (JP) .................. 2018-154157

(51) Int. Cl.
| | |
|---|---|
| *C09K 8/035* | (2006.01) |
| *C04B 24/18* | (2006.01) |
| *C04B 24/20* | (2006.01) |
| *C04B 28/14* | (2006.01) |
| *C08H 7/00* | (2011.01) |
| *C09K 8/467* | (2006.01) |
| *C04B 103/40* | (2006.01) |

(52) U.S. Cl.
CPC .............. *C09K 8/035* (2013.01); *C04B 24/18* (2013.01); *C04B 24/20* (2013.01); *C04B 28/14* (2013.01); *C08H 6/00* (2013.01); *C09K 8/467* (2013.01); *C04B 2103/408* (2013.01)

(58) Field of Classification Search
CPC ........ C09K 8/035; C09K 8/467; C04B 24/18; C04B 24/20; C04B 28/14; C04B 2103/408; C04B 28/04; C04B 2103/44; C04B 2111/40; C04B 28/02; C04B 40/0039; C04B 40/0042; C08H 6/00; C08L 97/005
See application file for complete search history.

(56) References Cited

U.S. PATENT DOCUMENTS

| | | | |
|---|---|---|---|
| 4,284,433 A | 8/1981 | Aignesberger et al. | |
| 4,322,301 A | 3/1982 | Blackmore | |
| 4,977,227 A | 12/1990 | Negami et al. | |

FOREIGN PATENT DOCUMENTS

| | | | |
|---|---|---|---|
| EP | 3 674 352 A1 | 7/2020 | |
| GB | 1 498 383 A | 1/1978 | |
| JP | 51-87530 A | 7/1976 | |
| JP | 5187530 | * 7/1976 | |
| JP | 54-139929 A | 10/1979 | |
| JP | 54139929 | * 10/1979 | |
| JP | 63-35690 A | 2/1988 | |
| JP | 1-145358 A | 6/1989 | |
| JP | 2002-146028 A | 5/2002 | |
| JP | 2011-240223 A | 12/2011 | |
| JP | 2011-240224 A | 12/2011 | |
| JP | 2011240224 | * 12/2011 | |
| JP | 5769930 B2 | 7/2015 | |
| JP | 2015-193804 A | 11/2015 | |
| JP | 2015193804 | * 11/2015 | |

OTHER PUBLICATIONS

International Search Report dated Sep. 17, 2019 in PCT/JP2019/031511 filed Aug. 8, 2019, 2 pages.
Decision to Grant a Patent dated Jan. 19, 2021 in Japanese Application No. 2018-152860, 5 pages, (with English Translation).
Notice of Reasons for Refusal dated Jan. 5, 2021 in Japanese Application No. 2018-150844, 9 pages, (with English Translation).
Notice of Reasons for Refusal dated Jan. 5, 2021 in Japanese Application No.2018-154157, 8 pages, (with English Translation).
Extended European Search Report dated Apr. 5, 2022 in European Patent Application No. 198582821), 6 pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

A composition including: a lignin sulfonic acid-based compound and a water-soluble compound; a lignin derivative that is a reaction product of the lignin sulfonic acid-based compound with an aromatic water-soluble compound; or the lignin sulfonic acid-based compound, the water-soluble compound, and the lignin derivative. The composition is a granular product or a liquid product.

14 Claims, 3 Drawing Sheets

COMPOSITION AND PRODUCTION METHOD OF SAME, AND DISPERSING AGENT

FIELD

The present invention relates to a composition and a production method of the same, as well as a dispersing agent.

BACKGROUND

Lignin is a naturally occurring polymer component that is present in a wood and is commercially produced in a large scale in a paper making industry that uses a wooden material as a raw material. For example, a craft lignin is obtained from a craft pulp waste liquid, and a lignin sulfonic acid is obtained from a sulfite pulp waste liquid. The craft lignin and the lignin sulfonic acid, or processed products thereof are frequently used as a dispersing agent in wide industrial fields using a dye, a hydraulic composition (for example, a cement and a gypsum), an inorganic and an organic pigment, a coal-water slurry, an agricultural chemical, ceramics, and oil field drilling mud, and so forth.

Lignin derivatives that are considered to be used in various uses such as the oil field drilling mud have been proposed (see, for example, Patent Literatures 1 and 2). It is demonstrated that these lignin derivatives have a low viscosity after a thermal history at high temperature, and have superior thermal characteristics.

In addition, for example, in Patent Literature 3, the use of a modified lignin sulfonate salt as a dye dispersing agent, in which amounts of the sulfonate group and of the carboxylate group as well as the molecular weight thereof are controlled, is disclosed. In Patent Literature 4, the use of a graft copolymer as a cement dispersing agent, in which the graft copolymer is formed of a lignin sulfonic acid and an acrylic monomer or a vinyl monomer and has a molecular weight distribution within a prescribed range, is disclosed. In Patent Literature 5, a graft copolymer of acrylic acid with a lignin sulfate salt is disclosed as a dispersion stabilizing agent for the oil field drilling mud. In Patent Literature 6, a lignin derivative that is a reaction product of a lignin sulfonate salt with a water-soluble monomer having a polyalkylene oxide chain is disclosed.

CITATION LIST

Patent Literature

Patent Literature 1: Japanese Patent Application Laid-open No. 2011-240224
Patent Literature 2: Japanese Patent Application Laid-open No. 2011-240223
Patent Literature 3: Japanese Patent Application Laid-open No. 2002-146028
Patent Literature 4: Japanese Patent Application Laid-open No. H01-145358
Patent Literature 5: U.S. Pat. No. 4,322,301
Patent Literature 6: Japanese Patent No. 5769930

SUMMARY

Technical Problem

It has been known that a lignin sulfonic acid is generally poor in a heat resistance. Because of this, when this is used as a cement dispersing agent or the like under a high temperature condition such as in summer and for drilling, it is necessary to enhance the heat resistance at a further higher temperature; thus, there is a room for improvement therein.

The high performance lignin derivatives described in Patent Literatures 3 to 6 are liquid products. When liquid, the water content therein needs to be recalculated at a work site; and thus, the solid product is wanted because of handling convenience. In addition, when liquid, because individual packaging and the like as a solid product are difficult, a prescribed amount thereof needs to be measured at a work site.

When the lignin derivative is used as a solid product, this needs to be dissolved in a mortar, a cement paste, a ready-mixed concrete, or the like so as to express an intended effect.

On top of this, performances of the lignin-based dispersing agents described in Patent Literatures 3 to 6 are unsatisfactory.

A first object of the present invention is to provide a solid product of a lignin-containing composition exhibiting a high dispersibility and having a superior heat resistance.

A second object of the present invention is to provide a solid product of a high performance lignin derivative that can be used as a dispersing agent and the like, and that can be conveniently used at a work site or the like of a concrete or the like, and that can be used as a premix with a hydraulic composition.

A third object of the present invention is to realize effective use of the lignin as a recyclable biomass resource from a viewpoint of reduction in an environmental burden in recent years. More specifically, the object is to provide a composition capable of becoming a dispersing agent that can give a thickening property to various substance to be dispersed regardless of the use thereof such as a hydraulic composition, a dye, an inorganic and an organic pigment, a coal-water slurry, an agricultural chemical, ceramics, and oil field drilling mud, and that can improve the properties thereof.

Solution to Problem

The inventors of the present invention have carried out an extensive investigation to achieve the objects described above. As a result, it has been found that when the composition includes a lignin sulfonic acid-based compound and a water-soluble compound, or includes a lignin derivative that is a reaction product of a lignin sulfonic acid-based compound with an aromatic water-soluble compound and satisfies a prescribed condition, the objects can be achieved. On the basis of these findings, the present invention has been completed.

The inventors provide the following [1] to [25].

[1] A composition (hereinafter, also referred to as the composition (1)) comprising a lignin sulfonic acid-based compound and a water-soluble compound.
[2] The composition according to [1], wherein a thermal weight reduction rate of the composition that is measured by using a thermogravimetric differential thermal analyzer is 50 to 80%, and the composition is a granular product.
[3] The composition according to [2], wherein a thermal decomposition point of the composition that is measured by using the thermogravimetric differential thermal analyzer is 350° C. or higher and lower than 400° C.

[4] The composition according to [2] or [3], wherein the composition further comprises a lignin derivative that is a reaction product of a lignin sulfonic acid-based compound with a water-soluble compound.
[5] The composition according to [4], wherein the lignin derivative has an anionic functional group.
[6] The composition according to [4] or [5], wherein the lignin derivative has a polyalkylene oxide chain whose average addition mole number of an alkylene oxide is 25 or more.
[7] The composition according to any one of [4] to [6], wherein in the lignin derivative, a reaction weight ratio of the lignin sulfonic acid-based compound [L] to the water-soluble compound [M] ([L]/[M]) is 1 to 99/99 to 1.
[8] The composition according to any one of [2] to [7], wherein the water-soluble compound is an aromatic water-soluble compound.
[9] The composition according to [8], wherein the aromatic water-soluble compound comprises one or more compounds selected from the group consisting of an aromatic water-soluble compound having a polyalkylene oxide chain, an aromatic water-soluble compound having a carboxy group, and an aromatic water-soluble compound having a sulfo group.
[10] The composition according to [8] or [9], wherein the composition comprises a lignin derivative with which a reaction rate of the aromatic water-soluble compound is 50% or more.
[11] A dispersing agent (hereinafter, also referred to as the dispersing agent (1)) comprising the composition according to any one of [1] to [10].
[12] The dispersing agent according to [11], wherein the dispersing agent is for oil field drilling mud or for a hydraulic composition.
[13] A composition (hereinafter, also referred to as the composition (2)) comprising a lignin derivative that is a reaction product of a lignin sulfonic acid-based compound with an aromatic water-soluble compound, wherein the lignin derivative satisfies following conditions (A) and (B) and is a granular product, or
 the lignin derivative satisfies following conditions (1) and (2) and is a liquid product;
 condition (A): an average particle diameter is in a range of 30 to 250 μm;
 condition (B): in a particle size distribution, an accumulated area of a particle diameter of 100 μm or less is 15.0% or more;
 condition (1): a B type viscosity in a solution form in which a nonvolatile content at 100° C. is 30% is 30 to 100 mPa·s; and
 condition (2): a surface tension in a solution form in which a nonvolatile content at 100° C. is 10% is 25 to 55 dyne/cm.
[14] The composition according to [13], wherein when the lignin derivative is the granular product, the lignin derivative further satisfies a following condition (C):
 condition (C): a tapped apparent specific gravity thereof is in a range of 0.1 to 0.7 g/mL.
[15] The composition according to [13] or [14], wherein the lignin derivative has an anionic functional group.
[16] The composition according to any one of [13] to [15], wherein the lignin derivative has a polyalkylene oxide chain whose average addition mole number of an alkylene oxide is 25 or more.
[17] The composition according to any one of [13] to [16], wherein in the lignin derivative, a reaction weight ratio of the lignin sulfonic acid-based compound [L] to the aromatic water-soluble compound [M] ([L]/[M]) is 1 to 99/99 to 1.
[18] The composition according to any one of [13] to [17], wherein the aromatic water-soluble compound comprises one or more compounds selected from the group consisting of an aromatic water-soluble compound having a polyalkylene oxide chain, an aromatic water-soluble compound having a carboxy group, and an aromatic water-soluble compound having a sulfo group.
[19] The composition according to any one of [13] to [18], wherein the composition comprises a lignin derivative with which a reaction rate of the aromatic water-soluble compound is 50% or more.
[20] A dispersing agent (hereinafter, also referred to as the dispersing agent (2)) comprising the composition according to any one of [13] to [19].
[21] The dispersing agent according to [20], wherein the dispersing agent is for a hydraulic composition.
[22] A hydraulic composition comprising: a hydraulic material; and the dispersing agent according to [20] or [21].
[23] The hydraulic composition according to [22], wherein the hydraulic composition is a cement composition or a gypsum composition.
[24] A method for producing a composition, wherein the method is to produce the composition according to any one of [13] to [19], the method comprising a step of obtaining the lignin derivative by reacting the lignin sulfonic acid-based compound with the aromatic water-soluble compound.
[25] A method for producing a composition, the method comprising: a step of preparing a liquid composition comprising a lignin derivative that is a reaction product of a lignin sulfonic acid-based compound with an aromatic water-soluble compound, and a step of obtaining a dried solid product by drying the liquid composition, wherein the dried solid product satisfies following conditions (A) and (B) and is a granular product:
 condition (A): an average particle diameter is in a range of 30 to 250 μm; and
 condition (B): in a particle size distribution, an accumulated area of a particle diameter of 100 μm or less is 15.0% or more.

Advantageous Effects of Invention

According to the present invention, a solid product of a lignin-containing composition exhibiting a high dispersibility and having a superior heat resistance can be provided.

According to the present invention, a solid product of a high performance lignin derivative that can be used as a dispersing agent and the like, and that can be conveniently used at a work site or the like of a concrete or the like, and in addition, that can be used as a premix with a hydraulic composition can be provided.

According to the present invention, a composition capable of becoming a dispersing agent that can give a thickening property to various substances to be dispersed, regardless of the use thereof such as a hydraulic composition, a dye, an inorganic and an organic pigment, a coal-water slurry, an agricultural chemical, ceramics, and oil field drilling mud, and that can improve the properties of the substance to be dispersed can be provided.

DESCRIPTION OF EMBODIMENTS

Figure 1:
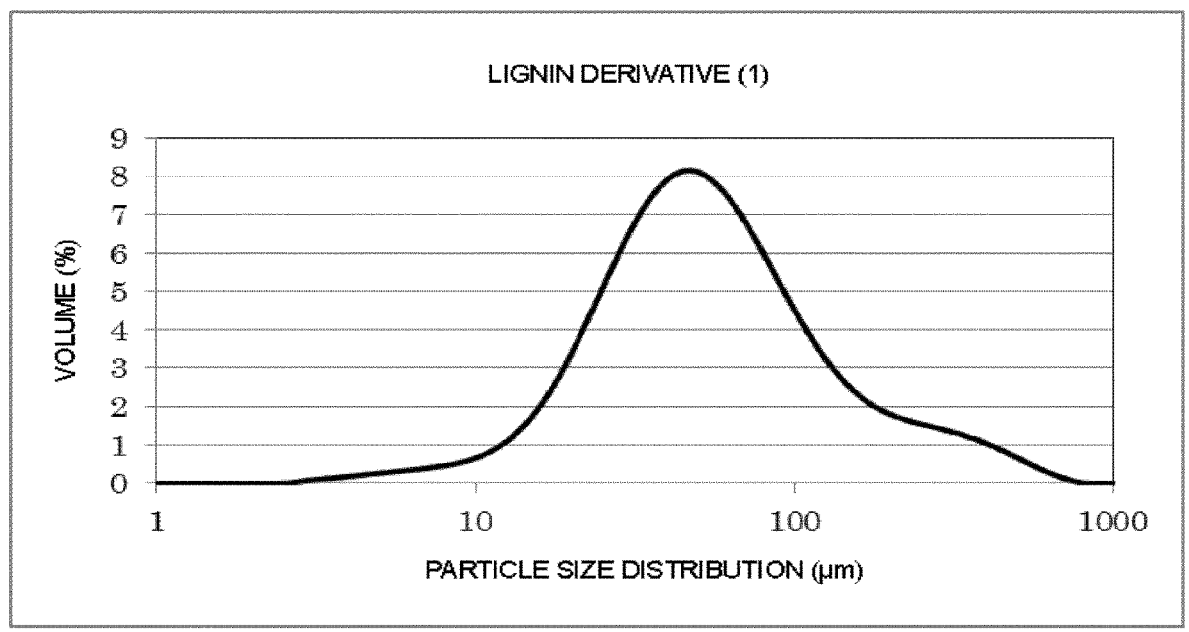
FIG. 1 is a chart illustrating a particle size distribution of the lignin derivative (1) that is produced in Production Example 1.

Hereinafter, the present invention will be explained in detail in line with preferred embodiments thereof. In this specification, note that the expression "AA to BB" means "AA or more and BB or less". A thermogravimetric differential thermal analyzer is sometimes described also as "TG-DTA". "Liquid product" is a concept including not only an aqueous solution in which a solute is completely dissolved in a solvent but also a suspension in which at least part of a solute is dispersed in a solvent.

1. Composition (1)

The composition (1) according to the present invention includes a lignin sulfonic acid-based compound and a water-soluble compound. In addition, in the composition (1) according to the present invention, it is preferable that a thermal weight reduction rate that is measured by TG-DTA be 50 to 80%, and that the composition be granular. It is more preferable that the thermal decomposition point that is measured by TG-DTA be 350° C. or higher and lower than 400° C.

1-1. Physical Properties

In the composition (1) according to the present invention, a lower limit of the thermal weight reduction rate that is measured by TG-DTA is preferably 50% or more, more preferably 55% or more, while still more preferably 60% or more. When the lower limit is 50% or more, the amount of ash thereof is so small that an adverse action to a dispersing agent due to an inevitable impure substance other than the lignin derivative can be suppressed; and thus, a high dispersibility can be ensured. The upper limit thereof is preferably 80% or less, more preferably 75% or less, while still more preferably 70% or less. When the upper limit is 80% or less, the heat resistance thereof can be ensured. Accordingly, the thermal weight reduction rate thereof that is measured by TG-DTA is preferably 50 to 80%, more preferably 55 to 75%, while still more preferably 60 to 70%.

In the composition (1) according to the present invention, a lower limit of the thermal decomposition point that is measured by TG-DTA is preferably 350° C. or higher, more preferably 360° C. or higher, while still more preferably 370° C. or higher. When the lower limit is 350° C. or higher, the heat resistance thereof can be ensured. The upper limit thereof is lower than 400° C., preferably 398° C. or lower, while more preferably 396° C. or lower. When the upper limit is lower than 400° C., the composition (1) can be suppressed from resignification so that this can function as a dispersing agent as well as a binder. Accordingly, the thermal decomposition point that is measured by TG-DTA is preferably 350° C. or higher and lower than 400° C., more preferably 360 to 398° C., while still more preferably 370 to 396° C.

The thermal decomposition point and the thermal weight reduction rate that are measured by TG-DTA are the values measured with a thermogravimetric differential thermal analyzer (TG-DTA) (trade name of "STA 7200", manufactured by Seiko Instruments Inc.).

More specifically, these are the values measured in accordance with the following procedure. Firstly, 10 g of the composition is dried and solidified. Drying and solidification may be done by any one of the following methods: 1) a method in which the composition is dried and solidified by using a dryer (trade name of "Fan Type Constant Temperature and Humidity Dryer DKM 600", manufactured by Yamato Scientific Co., Ltd.) at 105° C. for 1 day; 2) a method in which the composition is freeze-dried and solidified by using a freeze dryer (trade name of "FDU-1200", manufactured by Tokyo Rikakikai Co., Ltd.) at −20° C. for 1 day; and 3) a method in which the composition is dried and solidified by using a spray dryer (trade name of "TR 120", manufactured by Preci Co., Ltd.) at 180° C. Next, about 10 mg of the sample thus solidified is heated under a nitrogen atmosphere from 50° C. to 600° C. with the temperature raising rate of 10° C./minute. The temperature at the time when the weight reduction rate of the sample is the largest is taken as the thermal decomposition point, and the weight reduction rate until 600° C. is taken as the thermal weight reduction rate. The measurement is done 3 times for every sample; and the average value thereof is taken as the values described above.

The thermal decomposition point and the thermal weight reduction rate that are measured by TG-DTA can be controlled by appropriately controlling kinds and amounts of the lignin sulfonic acid-based compound, the water-soluble compound, and the lignin derivative. Especially when the composition includes the lignin derivative, these values can be controlled by appropriately designing the reaction condition of the lignin derivative. More specifically, the control may be done by appropriately changing a kind and an amount of a reaction initiator, a concentration of the reaction solution, a ratio of the lignin sulfonic acid-based compound to the water-soluble compound, a kind and an amount of a side-chain functional group of the water-soluble compound, a reaction temperature, a reaction time, and the like.

1-2. Lignin Sulfonic Acid-Based Compound

The lignin sulfonic acid-based compound is a compound whose carbon at the α-position of the side chain in a lignin's hydroxyphenyl propane structure is cleaved, and then has a skeleton having a sulfo group (sulfonic acid group) introduced therein. The structure of the skeleton portion is illustrated in the formula (1).

[Chemical Formula 1]

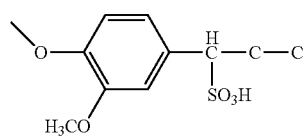

(1)

The lignin sulfonic acid-based compound may be a modified product of the compound having the skeleton that is illustrated by the formula (1) (hereinafter, this is also called "modified lignin sulfonic acid-based compound") There is no particular restriction in the modification method. Illustrative examples of the method include chemical modification methods such as a hydrolysis, an alkylation, an alkoxylation, a sulfonation, an esterification of a sulfonic acid, a sulfomethylation, an aminomethylation, and a desulfonation; and a method in which the lignin sulfonic acid-based compounds are fractionated on the basis of a molecular weight thereof by ultrafiltration. Among the chemical modification methods, one, or two or more modification methods selected from a hydrolysis, an alkoxylation, a desulfonation, and an alkylation are preferable.

The lignin sulfonic acid-based compound can have a salt form. Illustrative examples of the salt include a monovalent metal salt, a divalent metal salt, an ammonium salt, and an organic ammonium salt. Among these, a calcium salt, a magnesium salt, a sodium salt, a mixed calcium and sodium salts, and the like are preferable.

Both the production method and the origin of the lignin sulfonic acid-based compound are not particularly restricted; and thus, the compound may be any of a naturally occurring compound and a synthetic compound. The lignin sulfonic acid-based compound is one of the major components in the sulfite pulp waste liquid obtained by digestion of a wooden material under an acidic condition. Therefore, the lignin sulfonic acid-based compound originated from the sulfite pulp waste liquid may be used.

Because the lignin sulfonic acid-based compound (modified lignin sulfonic acid-based compound) is included abundantly in commercially available products, these commercially available products may be used in the present invention. Illustrative examples of the commercially available product include Vanillex HW (manufactured by Nippon Paper Industries Co., Ltd.), SunEkis M (manufactured by Nippon Paper Industries Co., Ltd.), Pearllex NP (manufactured by Nippon Paper Industries Co., Ltd.), and Sunflow RH (manufactured by Nippon Paper Industries Co., Ltd.).

Usually, the lignin sulfonic acid-based compound has at least one functional group portion that can react with the water-soluble compound. Illustrative examples of the portion like this include a carboxy group, a hydroxy group (a phenolic hydroxy group and an alcoholic hydroxy group), a thiol group, a sulfo group, an aromatic ring, an ether bond, and an alkyl chain.

1-3. Water-Soluble Compound

The water-soluble compound is a compound exhibiting a water-soluble property. Illustrative examples of the water-soluble compound include an aromatic water-soluble compound having at least one aromatic skeleton and a heretofore known (co)polymer as a cement dispersing agent. Among these, the water-soluble compound is preferably the aromatic water-soluble compound having at least one aromatic skeleton. The aromatic water-soluble compound is preferably a compound capable of reacting with a sulfite pulp waste liquid, namely, a compound capable of reacting with a major component in the sulfite pulp waste liquid; thus, the compound is preferably a compound capable of forming a bond by a chemical reaction with a functional group included in the lignin sulfonic acid-based compound (for example, a phenolic hydroxy group, an alcoholic hydroxy group, a carboxy group, and a thiol group). The type of the chemical reaction is not particularly restricted either. Illustrative examples thereof include a radical reaction, an ionic bonding, a coordination bonding, a condensation reaction, a reaction accompanied with hydrolysis, a reaction accompanied with dehydration, a reaction accompanied with oxidation, a reaction accompanied with reduction, and a reaction accompanied with neutralization.

It is preferable that the aromatic water-soluble compound have at least one polar group. With this, not only physical properties of the composition (1) can be readily controlled, but also the reactivity can be enhanced upon reacting with the lignin sulfonic acid-based compound. The polar group may be an ionic functional group, too. Illustrative examples of the polar group include functional groups such as a carboxy group, a hydroxy group, a sulfo group, a nitroxyl group, a carbonyl group, a phosphate group, an amino group, and an epoxy group. These aromatic water-soluble compounds may be used singly or as a combination of two or more of them.

Illustrative examples of the aromatic water-soluble compound include following [A] to [D]. The aromatic water-soluble compound is preferably at least one compound selected from [A] to [C], while only [A] or a combination of [A] with [B] and/or [C] is more preferable.

([A] Aromatic Water-Soluble Compound Having Polyalkylene Oxide Chain)

The carbon atom number of the alkylene oxide unit that constitutes the polyalkylene oxide chain (group) is not particularly restricted; this number is usually 2 to 18, preferably 2 to 4, while more preferably 2 to 3. Illustrative examples of the alkylene oxide unit include an ethylene oxide unit, a propylene oxide unit, and a butylene oxide unit. Among these, the ethylene oxide unit or the propylene oxide unit is preferable.

The average addition mole number of the alkylene oxide unit is preferably 25 or more, more preferably 30 or more, while still more preferably 35 or more. With this, the dispersibility can be enhanced. The upper limit thereof is preferably 300 or less, more preferably 200 or less, while still more preferably 150 or less. With this, deterioration in a dispersion retention property can be suppressed. Accordingly, the average addition mole number is preferably 25 to 300, more preferably 30 to 200, while still more preferably 35 to 150. Note that the average addition mole number described above is a rough indication; thus, regardless whether the above range is satisfied or not, [A] may have a group not repeatedly added with the alkylene oxide unit (monoalkylene oxide group).

The polyalkylene oxide chain may be composed of only one kind, or two or more kinds of the alkylene oxide unit. When the polyalkylene oxide chain is composed of two or more kinds of the polyalkylene oxide group, the addition type of the polyalkylene oxide groups thereto may be any of a random type, a block type, and a mixture of these. The terminal unit of the polyalkylene oxide chain is usually a hydroxy group, although not limited to this. The terminal unit may be an alkyl ether group or a carboxylate ester group so far as the bonding with the lignin sulfonic acid-based compound is not disturbed.

Illustrative examples of [A] include adducts of the oxyalkylene group to an aromatic compound such as phenol, cresol, nonyl phenol, naphthol, methyl naphthol, butyl naphthol, bisphenol A, and bisphenol S. More specifically, a polyalkylene oxide alkylphenyl ether, a polyalkylene oxide phenyl ether, a polyalkylene oxide alkylnaphthyl ether, and a polyalkylene oxide naphthyl ether may be mentioned. Among these, in view of an enhanced co-condensation property, a benzene ring derivative is preferable, and at least one of the polyalkylene oxide alkylphenyl ether and the polyalkylene oxide phenyl ether is more preferable, while the polyalkylene oxide phenyl ether (especially, an adduct of the oxyalkylene group to phenol) is still more preferable (for example, poly(ethyleneoxide) monophenyl ether and poly (propyleneoxide) monophenyl ether, in which a preferable range of the average addition mole number of the ethylene oxide unit or the propylene oxide unit is as mentioned before). [A] may be one kind, or a combination of two or more kinds of the compounds mentioned above.

([B] Aromatic Water-Soluble Compound Having Carboxy Group)

Illustrative examples of [B] include derivatives of a naphthalene ring or a benzene ring, in which the derivatives have at least one carboxy group. More specifically, isophthalic acid, oxynaphthoic acid, benzoic acid, hydroxybenzoic acid, and isomers of these compounds may be mentioned. From a viewpoint of a superior reactivity, o-hydroxybenzoic acid, m-hydroxybenzoic acid, and p-hydroxybenzoic acid are preferable. [B] may be one kind, or a combination of two or more kinds of the compounds mentioned above.

([C] Aromatic Water-Soluble Compound Having Sulfo Group)

Illustrative examples of [C] include an alkylnaphthalene sulfonic acid, an alkylphenol sulfonic acid, aniline sulfonic acid, and an alkylbenzene sulfonic acid. More specifically, those that may be mentioned are naphthalene sulfonic acid, methylnaphthalene sulfonic acid, butylnaphthalene sulfonic acid, phenol sulfonic acid, cresol sulfonic acid, aniline sulfonic acid, benzene sulfonic acid, toluene sulfonic acid, and isomers and condensates of these compounds. Illustrative examples of the condensate include a condensate of naphthalene sulfonic acid with formaldehyde. From a viewpoint of superior reactivity, a phenol derivative having a sulfo group and aniline sulfonic acid are preferable, while phenol sulfonic acid and aniline sulfonic acid are more preferable. [C] may be one kind, or a combination of two or more kinds of the compounds mentioned above.

([D] Other Aromatic Water-Soluble Compound)

Illustrative examples of [D] include aromatic water-soluble compounds other than [A] to [C], for example, (alkyl) phenols such as phenol and cresol. [D] may be one kind, or a combination of two or more kinds of the compounds mentioned above.

(Heretofore Known (Co)Polymer)

Illustrative examples of the heretofore known (co)polymer include: a polymer derived from a (poly)alkylene glycol alkenyl ether type monomer; a water-soluble polyalkylene glycol having hydrogen atoms as the terminal groups at both ends; and a copolymer having at least two structural units selected from the group consisting of a polyoxyalkylene structural unit, a polycarboxylic acid structural unit, and a polyester structural unit (for example, International Patent Application Laid-open No. 2018/56124).

1-4. [E] Another Aromatic Compound

The composition (1) according to the present invention may include [E] another aromatic compound, in addition to the lignin sulfonic acid-based compound and the water-soluble compound. Illustrative examples of [E] include simple aromatic hydrocarbon compounds such as benzene and naphthalene. [E] may be one kind, or a combination of two or more kinds of compounds mentioned above.

When the composition (1) according to the present invention does not include the lignin derivative, the weight ratio of the lignin sulfonic acid-based compound ([L]), the water-soluble compound ([M]), and other aromatic compound ([E]) ([L]:[M]:[E]) is preferably 30 to 90:10 to 70:0 to 5, more preferably 40 to 85:15 to 60:0 to 3, while still more preferably 50 to 80:20 to 50:0 to 2.

1-5. Lignin Derivative

It is preferable that the composition (1) according to the present invention further include a lignin derivative, which is a reaction product of a lignin sulfonic acid-based compound with the water-soluble compound. Usually, the lignin derivative is a polymer including a composition unit derived from the lignin sulfonic acid-based compound and a composition unit derived from the water-soluble compound. In addition, the lignin derivative may include a composition unit derived from other aromatic compound.

Note that it is difficult to identify the chemical structure of the lignin derivative only by a general formula or the like, because the lignin, which is a skeleton of the lignin sulfonic acid-based compound that constitutes the lignin derivative, has a very complex molecular structure.

It is preferable that the lignin derivative have an anionic functional group and/or a polyalkylene oxide chain in the molecule thereof. With this, the dispersibility of the dispersing agent can be enhanced.

The anionic functional group is a functional group that exists as an anionic form in water. Illustrative examples thereof include a hydroxy group, a carboxy group, a sulfo group, a phosphoric acid group, and a phenolic hydroxy group. Among these, the carboxy group and the sulfo group are preferable.

The anionic functional group may be included in the composition unit derived from the water-soluble compound, or in part of the composition unit derived from the lignin sulfonic acid-based compound, or in both of them, in the lignin derivative.

The anionic functional group in the lignin derivative may be observed qualitatively and quantitatively by an analysis instrument such as NMR and IR.

It is preferable that the lignin derivative have a polyalkylene oxide chain in the molecule thereof. The carbon atom number in the alkylene oxide unit that constitutes the polyalkylene oxide chain is not particularly restricted. This number is usually 2 to 18, preferably 2 to 4, while more preferably 2 to 3. Illustrative examples of the alkylene oxide unit include an ethylene oxide unit, a propylene oxide unit, and a butylene oxide unit. Among these, the ethylene oxide unit and the propylene oxide unit are preferable.

The average addition mole number of the alkylene oxide unit is preferably 25 or more, more preferably 30 or more, while still more preferably 35 or more. With this, the dispersibility can be enhanced. The upper limit thereof is preferably 300 or less, more preferably 200 or less, while still more preferably 150 or less. With this, deterioration in the dispersion retention property can be suppressed. Accordingly, the average addition mole number is preferably 25 to 300, more preferably 30 to 200, while still more preferably 35 to 150.

The polyalkylene oxide chain may be included in part of the composition unit derived from the lignin sulfonic acid-based compound, or in the composition unit derived from the water-soluble compound, or in both of them, although preferably in the latter, in the lignin derivative.

The polyalkylene oxide chain in the lignin derivative may be observed qualitatively and quantitatively by an analysis instrument such as NMR and IR.

(Preparation of the Lignin Derivative)

The lignin derivative may be prepared by a method in which the lignin sulfonic acid-based compound, the water-soluble compound, and as needed, the other aromatic compound is reacted. Illustrative examples thereof include a method in which the lignin sulfonic acid-based compound and the water-soluble compound are chemically bonded (a method in which a functional group in the lignin sulfonic acid-based compound (for example, a phenolic hydroxy group, an alcoholic hydroxy group, a carboxy group, or a thiol group) is bonded with a functional group in the water-soluble compound, or a method in which an aromatic skeleton portion in the lignin sulfonic acid-based compound is reacted with the water-soluble compound and with the other aromatic compound).

The lignin sulfonic acid-based compound that is used as a raw material in preparation of the lignin derivative may be a processed powder material having been treated with a powdering drying process or the like. The powder form thereof can be handled more easily.

From a viewpoint of reactivity, the water-soluble compound is preferably an aromatic water-soluble compound having at least one aromatic skeleton, more preferably an aromatic water-soluble compound having at least one polar group, still more preferably one or more compounds selected from the group consisting of [A] to [C], while further still more preferably only [A], or a combination of [A] with [B] and/or [C].

Hereinafter, examples in which the aromatic water-soluble is used as the water-soluble compound will be explained.

Illustrative examples of the method in which the lignin sulfonic acid-based compound is chemically bonded with the aromatic water-soluble compound include: a method in which the aromatic water-soluble compound is condensed with the lignin sulfonic acid-based compound (for example, formaldehyde condensation), a radical reaction, and an ionic bonding. More specifically, those that may be mentioned are: a method in which formaldehyde is added to the lignin sulfonic acid-based compound followed by bonding this adduct with the aromatic water-soluble compound; and a method in which, for example, a radical initiator is caused to act to the lignin sulfonic acid-based compound to abstract a hydrogen radical therefrom followed by causing a radical reaction of the radical thus formed with at least one aromatic water-soluble compound.

The reaction temperature may be appropriately determined in accordance with a solvent to be used. Therefore, the reaction temperature is not particularly restricted, although usually 0 to 200° C., while preferably 45 to 150° C. When a compound whose boiling point is low is used as the solvent, in order to enhance the reaction rate, it is preferable to carry out the reaction under a pressurized condition by using an autoclave.

The reaction of the lignin sulfonic acid-based compound with the aromatic water-soluble compound may be carried out by any of a solution reaction type and a bulk reaction type. In case of the solution reaction, a solvent may be used. Illustrative examples of the solvent include: water; alcohols such as methyl alcohol, ethyl alcohol, and isopropyl alcohol; aromatic hydrocarbons such as benzene, toluene, and xylene; aliphatic hydrocarbons such as cyclohexane and n-hexane; esters such as ethyl acetate; ketones such as acetone and methyl ethyl ketone; and cyclic ethers such as tetrahydrofuran and dioxane. Among these, at least one of water and a lower alcohol is preferably used, while water is more preferably used. With this, a solubility problem of the raw material monomers and of the copolymer thereby produced may be solved, and a step of removing the solvent may be omitted.

These solvents may be used singly, or two or more of them may be used together (for example, a water-alcohol mixed solvent).

At the time when the lignin derivative is prepared, an antifoaming agent may be used. With this, because foaming during the reaction can be suppressed, a uniform reaction system can be constructed.

In preparation of the lignin derivative, it is preferable to carry out the reaction stably. For this, when the reaction is carried out by a solution polymerization, a dissolved oxygen concentration in the used solvent at 25° C. may be controlled in the range of preferably 5 ppm or less, more preferably 0.01 to 4 ppm, still more preferably 0.01 to 2 ppm, while far still more preferably 0.01 to 1 ppm. Control of the dissolved oxygen concentration may be done in a reaction vessel or may be previously done before the reaction.

The progress of the reaction is characterized by a clear increase in the viscosity. When the viscosity reaches a prescribed level, the reaction may be stopped by cooling or neutralization.

In preparation of the lignin derivative, addition of water may be controlled so as to control the condensation viscosity and the condensation time. In addition, during the reaction, pH may be controlled so that this may be a proper value. Usually, the reaction is carried out under an acidic condition. When the reaction system is already acidic because of the aromatic compound having a sulfo group and of the unreacted acid included therein, the reaction may be carried out as it is in the acidic region. When the reaction system is not acidic, the reaction may be carried out after pH thereof is previously made to 2 or lower by adding an acid catalyst such as hydrochloric acid, phosphoric acid, sulfuric acid, nitric acid, or p-toluene sulfonic acid. The preferable acid is sulfuric acid, although the acid is not particularly restricted; an acid other than the specifically exemplified above acids may be used as well.

The reaction weight ratio of the lignin sulfonic acid-based compound [L] to the aromatic water-soluble compound [M] ([L]/[M]), these compounds constituting the lignin derivative, is not particularly restricted. Here, the ratio is preferably 99 to 1/1 to 99 (% by weight), more preferably 90 to 2/10 to 98 (% by weight), while still more preferably 70 to 5/30 to 95 (% by weight). When the ratio of the aromatic water-soluble compound [M] is 1.0% or more by weight, the lignin derivative thereby obtained can express the performance inherently possessed by the lignin skeleton, i.e., the effect to enhance the dispersibility. On the other hand, when the ratio of the aromatic water-soluble compound [M] is 99% or less by weight, the molecular weight of the lignin derivative thereby obtained can be brought into a suitable range; and thus, expression of the agglomeration thereof can be suppressed thereby leading to expression of the dispersion performance.

The ratio [L]/[M] is defined by (weight as a solid portion basis of the lignin sulfonic acid-based compound before reaction)/(weight as a solid portion basis of the aromatic water-soluble compound before reaction). In Examples to be described later, too, the ratio is measured in line with this definition.

The reaction rate of the aromatic water-soluble compound is preferably 50% or more, more preferably 60% or more, while still more preferably 70% or more. When the reaction rate is 50% or more, the dispersion performance of the lignin derivative to be obtained can be expressed well.

The reaction rate of the aromatic water-soluble compound can be measured as follows. In Examples to be described later, too, the reaction rate is measured by this method.

Firstly, in the measurement by a gel permeation chromatography (GPC), the peak areas before and after the reaction are compared by using UV (detection wavelength of 280 nm). Next, the reaction rate can be calculated by the formula: ([b]−[a])/[b], where [b] is a peak area before the reaction, and [a] is a peak area after the reaction.

The reaction weight ratio of the components other than the lignin sulfonic acid-based compound (aromatic water-soluble compound and other aromatic compound) that are used at the time of preparation of the lignin derivative is not particularly restricted, although the reaction weight ratio described below is preferable. Namely, the ratio is preferably [A]:[B]:[C]: ([D]+[E])=50 to 100% by weight:0 to 50% by weight:0 to 50% by weight:0 to 10% by weight. Note that [A]+[B]+[C]+[D]+[E]=100% by weight.

Here, [A] to [E] correspond to the compounds described before.

It is preferable that the reaction solution after completion of the condensation reaction be subjected to a post-treatment under a pH condition of 8.0 to 13.0 with heating at the temperature of 60 to 120° C. Usually, the post-treatment with heating is carried out continuously for a period of 10 minutes to 3 hours. By so doing, an aldehyde amount (for example, a formaldehyde amount) in the reaction solution can be eminently reduced. In addition to the removal method of formaldehyde that is liberated due to a so-called Cannizzaro reaction as described above or in place of this method, naturally, other method that is publicly known for reduction of excess formaldehyde in the chemical fields, such as in the fields of a melamine-formaldehyde resin and of a phenol-formaldehyde resin, may be carried out. Illustrative examples of the method like this include addition of a formaldehyde absorbing agent (addition of a small amount of sodium hydrogen sulfite, or addition of hydrogen peroxide).

The reaction product may be precipitated as a solid so as to be deposited in a bottom of the reaction vessel by controlling the pH in the reaction solution at 1.0 to 4.0, preferably 1.5 to 2.0. In this case, next, a supernatant salt solution is removed by separation. Then, the residual liberated reaction product, which is mostly salt-free, is re-dissolved into water the amount of which is determined so as to give an intended solid concentration to obtain the lignin derivative.

Neutralization may be done by using a neutralizing agent that can neutralize the reaction product and the catalyst. A basic compound (including a salt and a hydroxide thereof) may be mentioned as the neutralizing agent. More specifically, basic compounds such as sodium hydroxide, calcium hydroxide, and $Ba(OH)_2$ may be mentioned. With this, together with free sulfuric acid, calcium sulfate and barium sulfate, which are low in the solubility, are formed, and these are precipitated as a form of a gypsum and the like. Accordingly, the precipitated substances can be removed by filtration to obtain a salt-free polymer. Further, an unintended sodium sulfate may be removed by separation by means of a dialysis or a ultrafiltration.

Upon addition of and neutralization with the basic compound, when side-products such as sodium sulfate, calcium sulfate, and hydrates thereof are produced, it is preferable to add a basic compound under a warm state after the reaction and to keep this warm state so as to enhance removability of the side-products. The temperature at the time of warming is preferably 40° C. or higher. Retention time of the warm state is preferably 30 minutes or longer.

The lignin derivative may be the reaction product that is obtained by the reaction described above. This may be any of a liberated acid form and a neutralized salt form, although the neutralized salt is preferable, because the polymer can be stored and easily used. Illustrative examples of the neutralized salt of the reaction product include alkali metal salts such as a sodium salt and a potassium salt; alkali earth metal salts such as a calcium salt; and ammonium salts such as an organic amine salt.

In the lignin derivative thus obtained, the concentration thereof after completion of the reaction may be controlled, as needed.

(Physical Property of the Lignin Derivative)

The weight-average molecular weight of the lignin derivative is not particularly restricted, although this is preferably 1,000 to 500,000, more preferably 2,000 to 300,000, while still more preferably 5,000 to 100,000. The weight-average molecular weight can be measured in terms of polyethylene glycol by means of a heretofore known method using a gel permeation chromatography (GPC).

Measurement condition of GPC is as follows:
measurement instrument: manufactured by Tosoh Corp.,
used column: Shodex Column OH-pak SB-806HQ, SB-804HQ, and SB-802.5HQ,
eluting solution: 0.05 mM sodium nitrate/acetonitrile (8/2 (v/v)),
standard substance: polyethylene glycol (manufactured by Tosoh Corp. or by GL Science Inc.), and
detector: differential refractometer (manufactured by Tosoh Corp.).

1-6. Arbitrary Component

The composition (1) according to the present invention may include, in addition to the components described above, an arbitrary component so far as the advantageous effects of the present invention are not impaired. Illustrative examples of the arbitrary component include a dispersing agent for a hydraulic composition (for example, a cement dispersing agent and a gypsum dispersing agent), a dispersing agent for oil field drilling mud, a dye dispersing agent, a chelating agent, a cleaning agent, a coagulant, a thickener, a coating material, a paint, an adhesive, and a water-absorbing resin.

1-7. Method for Producing the Composition (1)

The composition (1) according to the present invention may be produced by a method (1) in which the lignin sulfonic acid-based compound and the water-soluble compound are blended separately, and then, this is followed by drying, or by a method (2) in which the lignin derivative, which is the reaction product of the lignin sulfonic acid-based compound with the water-soluble compound, is prepared, and then, this is followed by drying. Here, in the case that the lignin derivative is prepared, to the lignin derivative thus prepared, the lignin sulfonic acid-based compound and the water-soluble compound may be further blended. The method for preparation of the lignin derivative has already been described before. Hereinafter, the drying method will be described.

Illustrative examples of the drying method include: a method in which after neutralized with a hydroxide of a divalent metal such as calcium or magnesium to obtain a polyvalent metal salt, this is dried; a method in which after supported onto inorganic powders such as silica type fine powders, this is dried; a method in which drying with solidification is done in the form of a thin film formed on a supporting body of a dryer (for example, a drum type dryer, a disk type dryer, and a belt type dryer); and a method in which drying with solidification is done by using a spray dryer.

2. Dispersing Agent (1)

The dispersing agent (1) according to the present invention contains the composition (1) described above; and this can be used for various uses. Illustrative examples of the use thereof include a dispersing agent for a hydraulic composition (for example, a cement dispersing agent and a gypsum dispersing agent), a dispersing agent for oil field drilling mud, a dye dispersing agent, a chelating agent, a cleaning agent, a coagulant, a thickener, a coating material, a paint, an adhesive, and a water-absorbing resin. The composition (1) according to the present invention exhibits a high dispersibility and a superior heat distance. Accordingly, this dispersing agent is preferably used as a dispersing agent for oil field drilling mud or a dispersing agent for a hydraulic composition.

2-1. Dispersing Agent for Oil Field Drilling Mud

The dispersing agent (1) according to the present invention can be used as the dispersing agent for oil field drilling mud. The oil field drilling mud may be a mud that is used as a circulating fluid in a drilling well upon an oil field drilling work and/or upon a recovery work; and thus, the composition thereof is not particularly restricted. The oil field drilling mud is usually classified into a water type and an oil type; the water type mud is preferable. Usually, the water type mud includes clay.

Illustrative examples of the clay include montmorillonite and bentonite. Among these, bentonite is preferable.

The pH of the oil field drilling mud is not particularly restricted, although pH is preferably 9 to 13, more preferably 9.5 to 11.5, while still more preferably around 11. The temperature of the oil field drilling mud is not particularly restricted; the temperature may be high (for example, 80° C. or higher, preferably 90° C. or higher). The addition amount of the dispersing agent (1) according to the present invention to the oil field drilling mud is preferably 0.1% or more by weight, while more preferably 0.5% or more by weight, relative to the weight of the clay in the mud. The upper limit thereof is preferably 30% or less by weight, while more preferably 20% or less by weight.

2-2. Dispersing Agent for a Hydraulic Composition

The dispersing agent (1) according to the present invention can be used also as the dispersing agent for a hydraulic composition. Hereinafter, the use embodiment thereof will be explained.

As for the body to be dispersed, various hydraulic materials may be mentioned. The hydraulic material can be classified to a cement composition such as a cement and a gypsum, and to a hydraulic material other than the cement composition. Here, any of these may be used. The dispersing agent (1) according to the present invention can constitute, together with the above-mentioned hydraulic material and water, the hydraulic composition as the dispersing agent for the hydraulic composition. The hydraulic composition may further contain, as needed, a fine aggregate (sand and the like) and a rough aggregate (crushed stone and the like). Illustrative examples of the hydraulic material include a cement paste, a mortar, a concrete, and a plaster.

2-2-1. Cement Composition

Among the hydraulic compositions, a cement composition (composition including, as essential components, the dispersing agent (1) according to the present invention, a cement, and water), which uses a cement as the hydraulic material, is not only most popular but also one of the preferable embodiments. Hereinafter, the case that the hydraulic composition contains a cement (cement dispersing agent) will be explained.

The cement that can be used in the cement composition is not particularly restricted. Specifically, illustrative examples thereof include:

a Portland cement (normal, high early strength, ultrahigh early strength, moderate heat, sulfate salt resistance, as well as low-alkali types of these cements); various mixed cements (a blast furnace cement, a silica cement, and a fly ash cement); a white Portland cement; an alumina cement; an ultrarapid hardening cement (a one-clinker rapid hardening cement, a two-clinkers rapid hardening cement, and a magnesium phosphate cement); a grout cement; an oil field cement; a low heat generating cement (a low heat generating blast furnace cement, a fly ash mixed low heat generating blast furnace cement, and a belite high content cement); a ultrahigh strength cement; a cement type solidifying material; and an ecocement (a cement produced by using, as the raw material thereof, one or more ashes selected from a municipal waste incineration ash and a sewage sludge incineration ash).

The cement composition may be added with a component other than the cement described above. Illustrative examples of the component like this include:

fine powders (a blast furnace slag, a fly ash, a cinder ash, a clinker ash, a husk ash, a silica fume, a silica powder, a limestone powder, and the like); a gypsum; an aggregate (fire resistant aggregates such as a sand, a crushed stone, a water granulated slag, a regenerated aggregate, a siliceous earth, a clayish earth, a zircon earth, a high alumina earth, a carbonized siliceous earth, a graphite earth, a chrome earth, a chrome magnesia earth, and a magnesia earth).

The unit water content per 1 $m^3$ of the cement composition, i.e., the use amount of cement, and the water/cement ratio (weight ratio) are not particularly restricted; thus, the cement composition of a wide range from a poor blend to a rich blend may be used.

The unit water content is preferably 100 to 185 $kg/m^3$, while more preferably 120 to 175 $kg/m^3$.

The use amount of cement is preferably 200 to 800 $kg/m^3$, while more preferably 250 to 800 $kg/m^3$.

The water/cement ratio (weight ratio) is preferably 0.15 to 0.7, while more preferably 0.25 to 0.65.

The dispersing agent (1) according to the present invention may be used in the cement composition that is in a high water reduction rate region, namely, the region where the water/cement ratio (weight ratio) is low (for example, 0.15 to 0.5). In addition, this agent is effective in any of a high strength concrete, in which the unit cement amount is large and the water/cement ratio is low, and a poor blend concrete in which the use amount of cement (unit cement amount) is small (for example, about 300 $kg/m^3$ or less).

In the cement composition (for example, when this is used in a mortar, a concrete, or the like that uses a hydraulic cement), the lower limit of the blending amount of the dispersing agent (1) according to the present invention is, as a solid portion basis, preferably 0.01% or more by weight, more preferably 0.02% or more by weight, while still more preferably 0.05% or more by weight, relative to the cement weight. When the blending amount is 0.01% or more by weight, the dispersion performance thereof can be sufficiently expressed. The upper limit thereof is preferably 10.0% or less by weight, more preferably 7.0% or less by weight, while still more preferably 5.0% or less by weight. When the upper limit is 10.0% or less by weight, because the effect to enhance the dispersibility is not substantially saturated, not only an economical merit can be obtained but also adverse effects to the properties of a mortar and a concrete, the effects such as a retardation in the hardening speed and a deterioration in the strength, can be suppressed.

Therefore, the blending amount of the dispersing agent (1) according to the present invention is, relative to the weight of the cement, preferably 0.01 to 10.0% by weight, more preferably 0.02 to 7.0% by weight, while still more preferably 0.05 to 5.0% by weight. With the blending amount like this, favorable effects such as reduction in the unit water content, increase in the strength, and enhancement in the durability can be obtained.

The cement composition can express a high dispersibility as well as a high dispersion retention performance even in the high water reduction rate region. In addition, even at low temperature, the initial dispersibility as well as the decrease in the viscosity can be sufficiently expressed, thereby leading to a superior workability. Accordingly, by hardening, the cement composition is effective as the raw material of various kinds of the concrete.

Illustrative examples of the concrete include a ready-mixed concrete, a concrete for a concrete secondary product (pre-cast concrete), a concrete for centrifugal molding, a concrete for vibration fixation, a stem-curing concrete, and a shotcrete. In addition, a mortar or a concrete that are required to have a high fluidity, such as a medium fluidity concrete (concrete having the slump value of 22 to 25 cm), a high fluidity concrete (concrete having the slump value of 25 cm or more and the slump flow value of 50 to 70 cm), a self-fillable concrete, and a self-leveling material may be mentioned.

2-2-2. Gypsum Composition

In the hydraulic material, a gypsum-using gypsum composition (a composition containing, as the essential components, the dispersing agent (1) according to the present invention, a gypsum, and water) is also popular, and is one of the preferable embodiments of the present invention. Hereinafter, the case that the hydraulic composition contains a gypsum (gypsum dispersing agent) will be explained.

The gypsum is not particularly restricted so far as this is a mineral mainly composed of calcium sulfate ($CaSO_4$). Illustrative examples thereof include calcium sulfate hemihydrate ($CaSO_4 \cdot 1/2H_2O$: hemihydrate gypsum), calcium sulfate dihydrate ($CaSO_4 \cdot 2H_2O$: dihydrate gypsum), and anhydrous calcium sulfate ($CaSO_4$: anhydrous gypsum). Popular gypsum is the hemihydrate gypsum. The gypsum may be any of a natural gypsum and a chemical gypsum. In the natural gypsum, there is no restriction as to the origin and properties thereof. Illustrative examples of the chemical gypsum include a phosphate gypsum, a desulfurized flue-gas gypsum, a titanium gypsum, a scouring gypsum, and a fluorogypsum.

In the gypsum composition, the blending amount of the dispersing agent (1) according to the present invention is, as a solid portion basis, preferably 0.01% or more by weight, more preferably 0.05% or more by weight, while still more preferably 0.10% or more by weight, relative to the weight of the gypsum. When the blending amount is 0.01% or more by weight, a prescribed dispersibility can be expressed. The upper limit thereof is preferably 5.00% or less by weight, more preferably 3.00% or less by weight, while still more preferably 1.00% or less by weight. When the blending amount is 5.00% or less by weight, a retardation in the hydration speed of the gypsum, namely, a retardation in the hardening speed of the gypsum, does not take place; and thus, this can function as a dispersing agent that is excellent in workability.

Therefore, the blending amount of the dispersing agent (1) according to the present invention is preferably 0.01 to 5.00% by weight, more preferably 0.05 to 3.00% by weight, while still more preferably 0.10 to 1.00% by weight, relative to the weight of the gypsum. With the blending amount like this, various favorable effects such as reduction in the unit water content, increase in the strength, and enhancement in the durability can be obtained.

The water content in the gypsum composition can be arbitrarily determined. The content is usually 20% or more by weight, while preferably 40% or more by weight, relative to the weight of the gypsum. The upper limit thereof is usually 150% or less by weight, while preferably 100% or less by weight. The gypsum composition may include a usually used additive other than the gypsum, water, and the dispersing agent according to the present invention.

By way of the hardening treatments such as heating and drying, the gypsum composition can be used in a construction material such as a gypsum board and a gypsum plaster; a civil construction material such as a tunnel reinforcement material and a soil improvement material; a porcelain frame material, a dental model material, a gypsum cast mold material, and so forth.

2-2-3. Other Additives

When the dispersing agent (1) according to the present invention is used as the dispersing agent for the hydraulic composition, this agent may include at least the composition (1), and may further include an active component of other cement dispersing agent as well as an active component of other concrete additive. In addition, other cement dispersing agent and other concrete additive may be used together. In this specification, these are collectively called "other additives".

Illustrative usable examples of the active component in other cement dispersing agent and of the active component in other concrete additive include those described below. The active component in other cement dispersing agent and the active component in other concrete additive may be used singly, or two or more of them may be used together.

They are a lignin sulfonate salt; a polyol derivative; a naphthalene sulfonic acid formalin condensate; a melamine sulfonic acid formalin condensate; a polystyrene sulfonate salt; an aminosulfonic acid-based compound such as an aminoaryl sulfonic acid-phenol-formaldehyde condensate (for example, Japanese Patent Application Laid-open No. H01-113419);

a composition formed of (a) a component that is at least one of a copolymer of a polyalkylene glycol mono (meth)acrylate ester-based compound with a (meth) acrylic acid-based compound and a salt thereof, (b) a component that is at least any one selected from the group consisting of a copolymer of a polyalkylene glycol mono(meth)allyl ether-based compound with maleic anhydride, a hydrolysate thereof, and a salt thereof, and (c) a component that is at least one of a copolymer of a polyalkylene glycol mono(meth)allyl ether-based compound with a maleate ester of a polyalkylene glycol-based compound and a salt thereof (for example, Japanese Patent Application Laid-open No. H07-267705);

a composition formed of an A component formed of a copolymer of a polyalkylene glycol ester of (meth) acrylic acid with a (meth)acrylic acid (salt), a B component formed of a specific polyethylene glycol polypropylene glycol-based compound, and a C component formed of a specific surfactant (see, for example, Japanese Patent No. 2508113);

a vinyl copolymer including a composition unit of a polyethylene (propylene) glycol ester of (meth)acrylic acid or a composition unit of a polyethylene (propylene) glycol mono(meth)allyl ether, a composition unit of a (meth)allyl sulfonic acid (salt), and a composition unit of a (meth)acrylic acid (salt) (for example, Japanese Patent Application Laid-open No. S62-216950);

a water-soluble vinyl copolymer obtained by polymerization of a polyethylene (propylene) glycol ester of (meth)acrylic acid, a (meth)allyl sulfonic acid (salt), and a (meth)acrylic acid (salt) in aqueous solution (see, for example, Japanese Patent Application Laid-open No. H01-226757);

a copolymer obtained from a polyethylene (propylene) glycol ester of (meth)acrylic acid, a (meth)allyl sulfonic acid (salt) or a p-(meth)allyloxy benzene sulfonic acid (salt), and a (meth)acrylic acid (salt) (see, for example, Japanese Examined Patent Publication No. H05-36377);

a copolymer having monomer units formed of a polyethylene glycol mono(meth)allyl ether and a maleic acid (salt), respectively (see, for example, Japanese Patent Application Laid-open No. H04-149056);

a graft copolymer formed of a composition unit derived from a polyethylene glycol ester of a (meth)acrylic acid, a composition unit derived from a (meth)allyl sulfonic acid (salt), a composition unit derived from a (meth)acrylic acid (salt), and a composition unit including a polymer block obtained by radical polymerization of a $\alpha,\beta$-unsaturated monomer that is derived from an alkanediol mono(meth)acrylate or a polyalkylene glycol mono(meth)acrylate and has an amide group in its molecule (see, for example, Japanese Patent Application Laid-open No. H05-170501);

a water-soluble vinyl copolymer obtained by radical copolymerization of a polyethylene glycol mono(meth) allyl ether, a polyethylene glycol mono(meth)acrylate, a (meth)acrylic acid alkyl ester, a (meth)acrylic acid (salt), and a (meth)allyl sulfonic acid (salt) or a p-(meth)allyloxy benzene sulfonic acid (salt) in an aqueous system (see, for example, Japanese Patent Application Laid-open No. H06-191918);

a copolymer obtained by using a polyethylene glycol monoallyl ether, a maleic acid type monomer, and a monomer capable of copolymerizing with these monomers (see, for example, Japanese Examined Patent Publication No. S58-38380);

a copolymer obtained by neutralizing with an alkaline substance a copolymer obtained by using a polyalkylene glycol mono(meth)acrylate ester type monomer, a (meth)acrylic acid type monomer, and a monomer capable of copolymerizing with these monomers (see, for example, Japanese Examined Patent Publication No. S59-18338);

a polymer obtained by using a polyalkylene glycol (meth) acrylate ester having a sulfo group and, as needed, a monomer capable of copolymerizing with this monomer, or a polymer obtained by neutralizing this polymer with an alkaline substance (see, for example, Japanese Patent Application Laid-open No. S62-119147);

a product of an esterification reaction of a copolymer of an alkoxy polyalkylene glycol monoallyl ether and maleic anhydride with a polyalkylene oxide derivative having a terminal alkenyl group (see, for example, Japanese Patent Application Laid-open No. H06-271347);

a product of an esterification reaction of a copolymer of an alkoxy polyalkylene glycol monoallyl ether and maleic anhydride with a polyalkylene oxide derivative having a terminal hydroxy group (see, for example, Japanese Patent Application Laid-open No. H06-298555); and a polycarboxylic acid (salt) such as a copolymer formed of an alkenyl ether type monomer having a specific unsaturated alcohol such as 3-methyl-3-butene-1-ol added with ethylene oxide or the like, an unsaturated carboxylic acid type monomer, and a monomer capable of copolymerizing with these monomers, or a salt of this copolymer (see, for example, Japanese Patent Application Laid-open No. S62-68806).

Illustrative examples of the other cement dispersing agent and the other concrete additive include a water-soluble polymer, a polymer emulsion, an air entraining agent, a cement wetting agent, a swelling agent, a water protecting material, a delay agent, a thickener, a coagulant, a drying shrinkage reducing agent, a strength enhancer, a hardening facilitator, an antifoaming agent, an AE agent, a separation reducing agent, a self-leveling material, an anti-rusting agent, a colorant, an antifungal agent, and other surfactant. These may be used singly, or as a mixture of two or more of them.

Illustrative Examples of the Water-Soluble Polymer Include:

a unsaturated carboxylic acid polymer such as polyacrylic acid or a salt thereof (for example, sodium salt), polymethacrylic acid or a salt thereof (for example, sodium salt), polymaleic acid or a salt thereof (for example, sodium salt), and acrylic acid-maleic acid copolymer or a salt thereof (for example, sodium salt); a nonionic cellulose ether such as methyl cellulose, ethyl cellulose, hydroxymethyl cellulose, hydroxyethyl cellulose, carboxymethyl cellulose, carboxyethyl cellulose, and hydroxypropyl cellulose;

a polysaccharide derivative that is a polysaccharide derivative having a skeleton of an alkylated or hydroxyalkylated derivative of a polysaccharide (for example, methyl cellulose, ethyl cellulose, hydroxyethyl cellulose, and hydroxypropyl cellulose), in which a hydrogen atom in part or all of the hydroxy group is substituted with a hydrophobic substituent group having a hydrocarbon chain having the carbon atom number of 8 to 40 as a partial structure and with an ionic hydrophilic substituent group having a sulfo group or a salt thereof as a partial structure;

a polysaccharide such as a yeast glucan, a xanthan gum, and a $\beta$-1,3 glucan (any of a linear and a branched chain, such as curdlan, paramylon, pachyman, scleroglucan, and laminaran), all of which are produced by a microbial fermentation;

polyacrylamide; polyvinyl alcohol; a starch; a starch phosphate ester; a sodium alginate; a gelatin; and a copolymer of acrylic acid having an amino group in the molecule thereof, as well as a quaternary compound thereof.

Illustrative examples of the polymer emulsion include copolymers of various monomers such as an alkyl (meth) acrylate.

Illustrative Examples of the Hardening Retarding Agent Other than the Oxycarboxylic Acid-Based Compound Include:

saccharides such as monosaccharides (for example, glucose, fructose, galactose, saccharose, xylose, apiose, ribose, and isomerized glucose), disaccharides, trisaccharides, oligo saccharides (for example, dextrin), polysaccharides (for example, dextran), and a saccharide composition containing at least one of them (for example, molasses); a sugar alcohol such as sorbitol; magnesium silicofluoride; phosphoric acid or a slat thereof, or a borate ester; an aminocarboxylic acid and a salt thereof; an alkali-soluble protein; humic acid; tannic acid; phenol; a polyalcohol such as glycerin; phosphonic acid, aminotri(methylenephosphonic acid), 1-hydroxyethylidene-1,1-diphosphonic acid, ethylenediamine tetra(methylenephosphonic acid), diethylene triamine penta(methylenephosphonic acid), and alkali-metal salts and alkaliearth metal salts of these phosphonic acids and derivatives thereof.

Illustrative Examples of the High Early Strengthening Agent and the Facilitator Include:

soluble calcium salts such as calcium chloride, calcium nitrite, calcium nitrate, calcium bromide, and calcium iodide; chlorides such as iron chloride and magnesium chloride; a sulfate salt; potassium hydroxide; sodium hydroxide; a carbonate salt; a thiosulfate salt; formic acid and a formate salt such as calcium formate; an alkanol amine; an alumina cement; and calcium aluminate silicate.

Illustrative examples of the antifoaming agent other than the oxyalkylene type include:

mineral oil type antifoaming agents such as a kerosene and a liquid paraffin; fatty oil type antifoaming agents such as an animal oil and a plant oil, a sesame oil, a castor oil, and an alkylene oxide adduct of these oils; aliphatic acid type antifoaming agents such as oleic acid, stearic acid, and an alkylene oxide adduct of these acids; aliphatic acid ester type antifoaming agents such as glycerin monoricinoleate, an alkenyl succinic acid derivative, sorbitol monolaurate, sorbitol trioleate, and a natural wax; alcohol type antifoaming agents such as octyl alcohol, hexadecyl alcohol, acetylene alcohol, and a glycol; amide type antifoaming agents such as an acrylate polyamine; phosphate ester type antifoaming agents such as tributyl phosphate and sodium octylphosphate; metal soap type antifoaming agents such as aluminum stearate and calcium oleate; and silicone type antifoaming agents such as a dimethyl silicone oil, a silicone paste, a silicone emulsion, an organic-modified polysiloxanes (polyorganosiloxane such as dimethyl polysiloxane), and a fluorosilicone oil.

Illustrative examples of the AE agent include: a resin soap; a saturated or an unsaturated fatty acid; sodium hydroxystearate; lauryl sulfate; ABS (alkylbenzene sulfonic acid), LAS (linear alkylbenzene sulfonic acid), an alkane sulfonate, a polyoxyethylene alkyl (phenyl) ether, a polyoxyethylene alkyl (phenyl) ether sulfonic acid ester, and salts of them; a polyoxyethylene alkyl (phenyl) ether phosphoric acid ester, and a salt thereof; a protein material; an alkenyl sulfosuccinic acid; and an α-olefin sulfonate.

Illustrative Examples of the Other Surfactant Include:

aliphatic monovalent alcohols having 6 to 30 carbon atoms in the molecule thereof, such as octadecyl alcohol and stearyl alcohol; alicyclic monovalent alcohols having 6 to 30 carbon atoms in the molecule thereof, such as abiethyl alcohol; monovalent mercaptans having 6 to 30 carbon atoms in the molecule thereof, such as dodecyl mercaptan; alkylphenols having 6 to 30 carbon atoms in the molecule thereof, such as nonylphenol; amines having 6 to 30 carbon atoms in the molecule thereof, such as dodecylamine; polyalkylene oxide derivatives having 10 mole or more of an alkylene oxide such as ethylene oxide and propylene oxide added to a carboxylic acid having 6 to 30 carbon atoms in the molecule thereof such as lauric acid and stearic acid; alkyl diphenyl ether sulfonate salts in which two phenyl groups having a sulfo group and optionally an alkyl group or an alkoxy group as a substituent group thereof are ether-bonded;

various anionic surfactants other than those mentioned above; various cationic surfactants such as an alkylamine acetate and an alkyl trimethyl ammonium chloride; various nonionic surfactants; and various amphoteric surfactants.

Illustrative Examples of the Water Protecting Material Include:

an aliphatic acid (salt), an aliphatic acid ester, an oil fat, silicone, a paraffin, an asphalt, and a wax.

Illustrative examples of the anti-rusting agent include a nitrite salt, a phosphate salt, and zinc oxide.

Illustrative examples of the crack-reducing agent include a polyoxyalkyl ether.

Illustrative examples of the swelling agent include an ettringite type and a coal type.

When the dispersing agent (1) according to the present invention is used together with other additive, the blending ratio of the dispersing agent (1) according to the present invention to the other additive (namely, dispersing agent (1) according to the present invention/other additive, as a solid portion basis:weight ratio) is preferably 1 to 99/99 to 1, more preferably 5 to 95/95 to 5, still more preferably 10 to 90/90 to 10, while far still more preferably 20 to 80/80 to 20.

2-2-4. Oxycarboxylic Acid-Based Compound

The dispersing agent (1) according to the present invention may be used together with an oxycarboxylic acid-based compound, in addition to the other cement dispersing agent and the other concrete additive as described above. By so doing, the dispersibility retention performance thereof can be expressed more effectively even under a high temperature environment.

The oxycarboxylic acid-based compound is preferably an oxycarboxylic acid having the carbon atom number of 4 to 10, or a salt thereof. More specifically, illustrative examples thereof include gluconic acid, glucoheptonic acid, arabinoic acid, malic acid, succinic acid, as well as inorganic salts or organic salts of these acids with sodium, potassium, calcium, magnesium, ammonium, triethanolamine, or the like. These oxycarboxylic acid-based compounds may be used singly, or two or more of them may be used together.

Among these oxycarboxylic acid-based compounds, gluconic acid or a salt thereof is preferable. In particular, in the case of a poor blend concrete, it is preferable to use the lignin sulfonate salt type dispersing agent as the sulfonic acid type dispersing agent having a sulfo group in the molecule thereof, and gluconic acid or the salt thereof as the oxycarboxylic acid-based compound.

When the dispersing agent (1) according to the present invention and the oxycarboxylic acid-based compound are used together, the blending ratio of the dispersing agent (1) according to the present invention to the oxycarboxylic acid-based compound (namely, dispersing agent (1) according to the present invention/oxycarboxylic acid-based compound, as a solid portion basis; weight ratio) is preferably 1 to 99/99 to 1, more preferably 5 to 95/95 to 5, still more preferably 10 to 90/90 to 10, while far still more preferably 20 to 80/80 to 20.

When 3 components, i.e., the dispersing agent (1) according to the present invention, the other additive, and the oxycarboxylic acid-based compound, are used together, the blending ratio among the dispersing agent (1) according to the present invention, the other additive, and the oxycarboxylic acid-based compound (namely, dispersing agent (1) according to the present invention/other additive/oxycarboxylic acid-based compound, as a solid portion basis:weight ratio) is preferably 1 to 98/1 to 98/1 to 98, more preferably 5 to 90/5 to 90/5 to 90, still more preferably 10 to 90/5 to 85/5 to 85, while far still more preferably 20 to 80/10 to 70/10 to 70.

3. Composition (2)

The composition (2) according to the present invention contains a lignin derivative that is a reaction product of a lignin sulfonic acid-based compound with an aromatic water-soluble compound, in which the lignin derivative satisfies following conditions (A) and (B) and is a granular product (hereinafter, this is called "one embodiment"), or the lignin derivative satisfies the following conditions (1) and (2) and is a liquid product (hereinafter, this is called "another embodiment").

Condition (A): an average particle diameter is in the range of 30 to 250 μm.

Condition (B): in a particle size distribution, an accumulated area of the particle diameter of 100 μm or less is 15.0% or more.

Condition (1): a B type viscosity in a solution form in which a nonvolatile content at 100° C. is 30% is 30 to 100 mPa·s.

Condition (2): a surface tension in a solution form in which a nonvolatile content at 100° C. is 10% is 25 to 55 dyne/cm.

3-1. One Embodiment of the Composition (2)

One embodiment of the composition (2) according to the present invention satisfies the conditions (A) and the condition (B) and is a granular product; and in addition, it is preferable to further satisfy the condition (C).

Condition (A): an average particle diameter is in the range of 30 to 250 μm.

Condition (B): in a particle size distribution, an accumulated area of the particle diameter of 100 μm or less is 15.0% or more.

Condition (C): a tapped apparent specific gravity is in the range of 0.1 to 0.7 g/mL.

[Condition (A)]

The condition (A) is that an average particle diameter is in the range of 30 to 250 μm. Because the average particle diameter is in the range of 30 to 250 μm, not only the powder does not float in an air but also the solubility thereof is superior.

The average particle diameter defined in the condition (A) is measured as follows. Namely, 3 g of the powder sample is measured under a dry condition by using a laser diffraction type particle size distribution measurement instrument (Mastersizer 3000; manufactured by Malvern Panalytical Ltd.) to obtain a molecular weight distribution in which the particle size (μm) is expressed in the horizontal axis and the volume (%) is expressed in the vertical axis. The average particle diameter is the value when the accumulated distribution reaches 50%.

[Condition (B)]

The condition (B) is that in the particle size distribution, an accumulated area of the particle diameter of 100 μm or less is 15.0% or more. The upper limit of the particle size distribution is preferably 95.0% or less, while more preferably 85.0% or less. When the accumulated area of the particle diameter of 100 μm or less in the particle size distribution is within the range described above, this composition can be readily and uniformly mixed when added to the hydraulic composition.

The particle size distribution defined in the condition (B) is an accumulate distribution measured as follows. Namely, 3 g of the powder sample is measured under a dry condition by using a laser diffraction type particle size distribution measurement instrument (Mastersizer 3000; manufactured by Malvern Panalytical Ltd.) to obtain a molecular weight distribution, in which the particle size (μm) is expressed in the horizontal axis and the volume (%) is expressed in the vertical axis, and from which the accumulate distribution is obtained. The accumulated area is an accumulated area in which the particle diameter is 100 μm or less in the accumulate distribution.

[Condition (C)]

The condition (C) is that a tapped apparent specific gravity is in the range of 0.1 to 0.7 g/mL. When the tapped apparent specific gravity is in the range of 0.1 to 0.7 g/mL, not only floating of the powder in an air can be suppressed but also the solubility thereof into a solution can be enhanced.

The condition (C) is the value that is measured as follows. Namely, 10 to 15 g of the composition (2) is taken into a test tube having measuring marks (volume of 20 mL). The test tube is vibrated 50 times (40 rotations/minute) with a dropping height of 5 cm by using a specific volume measurement instrument (manufactured by Ishiyama Scientific Instruments Co., Ltd.) to measure the volume in the test tube. By substituting the measurement results into the following formula, the tapped apparent specific gravity is calculated.

Formula: tapped apparent specific gravity (g/mL)=mass of granular composition (g)/volume in test tube after vibration (mL)

[Controlling Method]

The conditions (A) to (C) can be controlled by appropriately designing the reaction condition between the lignin sulfonic acid-based compound and the aromatic water-soluble compound as well as the drying condition of the reaction product. More specifically, the control can be done by appropriately changing a kind and an amount of the reaction initiator, a kind and an amount of the acid catalyst, the concentration of the reaction solution, the ratio of the lignin sulfonic acid-based compound to the aromatic water-soluble compound, a kind and an amount of the side-chain functional group in the aromatic water-soluble compound, the reaction temperature, the reaction time, the drying condition, and the like.

In the one embodiment, details of the lignin derivative are omitted because these are the same as the contents described with regard to the composition (1) except that the water-soluble compound is limited to the aromatic water-soluble compound.

[Arbitrary Component]

The one embodiment of the composition (2) according to the present invention may contain, in addition to the lignin derivative, an arbitrary component so far as the advantageous effects of the present invention are not impaired. Illustrative examples of the arbitrary component include, in addition to raw material components such as a unreacted lignin sulfonic acid-based compound and a unreacted aromatic water-soluble compound, a dispersing agent for a hydraulic composition (for example, a cement dispersing agent and a gypsum dispersing agent), a dispersing agent for oil field drilling mud, a dye dispersing agent, a chelating agent, a cleaning agent, a coagulant, a thickener, a coating material, a paint, an adhesive, and a water-absorbing resin.

Production Method of the One Embodiment of the Composition (2)

The production method of the one embodiment of the composition (2) is to produce a granular composition. The method has a step of preparing a liquid composition including a lignin derivative, which is a reaction product of a lignin sulfonic acid-based compound with the aromatic water-soluble compound, and a step of obtaining a dried solid by drying the liquid composition, in which the dried solid satisfies the condition (A) and the condition (B).

Condition (A): an average particle diameter is in the range of 30 to 250 μm.

Condition (B): in the particle size distribution, the accumulated area of the particle diameter of 100 μm or less is 15.0% or more.

The step of preparing the liquid composition including the lignin derivative, the condition (A), and the condition (B) are the same as those described before. Therefore, the method to obtain the dried solid will be explained hereinafter.

Illustrative examples of the method to obtain the dried solid include: a method in which after neutralized with a hydroxide of a divalent metal such as calcium or magnesium to obtain a polyvalent metal salt, this is dried; a method in which after supported onto inorganic powders such as a silica type fine powder, this is dried; a method in which drying with solidification is done in the form of a thin film formed on a supporting body of a dryer (for example, a drum type dryer, a disk type dryer, and a belt type dryer); and a method in which drying with solidification is done by using a spray dryer.

3-2. Another Embodiment of the Composition (2)

Another embodiment of the composition (2) according to the present invention is that the lignin derivative satisfies the condition (1) and the condition (2), and that the composition is a liquid product. Therefore, because a thickening property can be given and the property can be improved, this can be used for various uses.

Condition (1): a B type viscosity in a solution form in which a nonvolatile content at 100° C. is 30% is 30 to 100 mPa·s.

Condition (2): a surface tension in a solution form in which a nonvolatile content at 100° C. is 10% is 25 to 55 dyne/cm.

When the other embodiment of the composition (2) according to the present invention is used as the dispersing agent, this can exhibit, as compared with the dispersing agent derived from a conventional lignin, a very high dispersing performance to various substances to be dispersed regardless of the use thereof such as a hydraulic composition, a dye, an inorganic and an organic pigment, a coal-water slurry, an agricultural chemical, ceramics, and oil field drilling mud. Accordingly, the other embodiment of the composition (2) according to the present invention can serve as a dispersing agent that is usable even in the field in which the dispersing agent derived from a conventional lignin is difficult to be used.

When the conventional lignin-based dispersing agent is used for the hydraulic composition, separation of raw materials (cement, rough aggregate, fine aggregate, and gypsum) of the hydraulic composition from water can take place, namely there is a chance of causing so-called bleeding. On the other hand, the dispersing agent using the other embodiment of the composition (2) according to the present invention is used to disperse the hydraulic composition, this bleeding can be suppressed. Therefore, because the separation of the raw materials of the hydraulic composition from water can be suppressed, a hardening strength of the hydraulic composition thereby obtained can be enhanced.

The dispersing agent using the other embodiment of the composition (2) according to the present invention is excellent also in concurrent use with the conventional lignin-based dispersing agent and the polycarboxylic acid type dispersing agent; thus, this can be suitably used in various fields. For example, when this is used as the concrete dispersing agent, a combination thereof with the conventional dispersing agent can express a further enhanced dispersibility in a wide region of the water-to-cement ratio.

The other embodiment of the composition (2) according to the present invention is a liquid product. When this is a liquid product, this can be readily mixed with a substance to be dispersed; and thus, this can serve as a dispersing agent that is capable of readily expressing an intended dispersion performance.

[Lignin Derivative]

In the other embodiment of the composition (2) according to the present invention, the lignin derivative satisfies "condition (1): a B type viscosity in a solution form in which a nonvolatile content at 100° C. is 30% is 30 to 100 mPa·s" and "condition (2): a surface tension in a solution form in which a nonvolatile content at 100° C. is 10% is 25 to 55 dyne/cm".

Here, "nonvolatile content at 100° C." means an amount of the residual substance obtained by heating the lignin derivative by using a fan dryer at 100° C. for 24 hours. Also, "a solution form in which a nonvolatile content is 30%" and "a solution form in which a nonvolatile content is 10%" means that an aqueous solution in which a concentration of a nonvolatile component in the lignin derivative is 28 to 32%, and that an aqueous solution in which a concentration of a nonvolatile component in the lignin derivative is 8 to 12%, respectively.

The B type viscosity is preferably 30 to 100 mPa·s, more preferably 35 to 90 mPa·s, while still more preferably 40 to 80 mPa·s. When the B type viscosity is within the numeral range as described above, a suitable viscosity can be given to a body to be dispersed; thus, workability of the slurry of the body to be dispersed can be enhanced. Note that the B type viscosity is the value obtained by using a BL type viscometer (manufactured by Toki Sangyo Co., Ltd.) under the condition of 20° C. and 60 rpm using the #2 rotor.

The surface tension is preferably 25 to 55 dyne/cm, more preferably 27 to 50 dyne/cm, while still more preferably 29 to 45 dyne/cm. When the surface tension is within the numeral range as described above, a wetting property to a body to be dispersed can be given, and the slurry state of a body to be dispersed can be improved. Note that the surface tension is the value obtained by measurement using a surface tension measurement instrument (CBVP-A3, manufactured by Kyowa Interface Science Co., Ltd.).

The conditions (1) and (2) can be controlled by appropriately designing the reaction condition between the lignin sulfonic acid-based compound and the aromatic water-soluble compound. More specifically, the control can be done by appropriately changing a kind and an amount of the reaction initiator, the concentration of the reaction solution, the ratio of the lignin sulfonic acid-based compound to the aromatic water-soluble compound, a kind and an amount of the side-chain functional group in the aromatic water-soluble compound, the reaction temperature, the reaction time, and the like.

In the other embodiment, other details of the lignin derivative are omitted because these are the same as the contents described with regard to the composition (1) except that the water-soluble compound is limited to the aromatic water-soluble compound.

4. Dispersing Agent (2)

The dispersing agent (2) according to the present invention contains the composition (2) described above, and thus, this can be used for various uses. Illustrative examples of the use thereof include a dispersing agent for a hydraulic composition (for example, a cement dispersing agent and a gypsum dispersing agent), a dispersing agent for oil field drilling mud, a dye dispersing agent, a chelating agent, a cleaning agent, a coagulant, a thickener, a coating material, a paint, an adhesive, and a water-absorbing resin.

4-1. Dispersing Agent (2) Containing the One Embodiment of the Composition (2)

The one embodiment of the composition (2) is a solid product of a high performance lignin derivative that can be used as a dispersing agent and the like in the construction site or the like using a concrete or the like. Because of this, not only the recalculation of the water amount at the construction site can be omitted but also exclusive equipment for water addition is not required; thus, workability can be improved. Accordingly, the dispersing agent (2) containing the one embodiment of the composition (2) is preferably a dispersing agent for a hydraulic composition and a dispersing agent for oil field drilling mud, while more preferably a dispersing agent for a hydraulic composition because a premixed concrete can be prepared by mixing this with the hydraulic composition itself.

When the dispersing agent (2) according to the present invention is used as the dispersing agent for oil field drilling mud, the oil field drilling mud may be merely a mud that is used as a circulating fluid in a drilling well upon oil field drilling and/or in a recovery work; and thus, the composition thereof is not particularly restricted. The oil field drilling mud is usually classified into a water type and an oil type; the mud is preferably the water type. Usually, the water type mud includes clay.

Illustrative examples of the clay include montmorillonite and bentonite. Among these, bentonite is preferable.

The pH of the oil field drilling mud is not particularly restricted. The pH is preferably 9 to 13, more preferably 9.5 to 11.5, while still more preferably around 11. The temperature of the oil field drilling mud is not particularly restricted. The temperature may be high (for example, 80° C. or higher, preferably 90° C. or higher). The addition amount of the dispersing agent according to the present invention is preferably 0.1% or more by weight, while more preferably 0.5% or more by weight, relative to the weight of the clay in the mud. The upper limit thereof is preferably 30% or less by weight, while more preferably 20% or less by weight.

The dispersing agent (2) according to the present invention may be used as a dye dispersing agent, too. The dye may be a disperse dye that is used by dispersing into a solvent. Illustrative examples thereof include an azo type disperse dye such as C. I. Disperse Red 17 and an anthraquinone type disperse dye such as C. I. Disperse Red 60. The material to be dyed is not particularly restricted. The material may be any of cloth and paper, and is preferably a material that is obtained by way of a high temperature dyeing process (for example, 100° C. or higher, 110° C. or higher, or 120° C. or higher). The material is preferably a synthetic cloth (for example, polyester, acetate, and nylon).

Temperature condition in high temperature dyeing is not particularly restricted either. The addition amount of the dispersing agent (2) according to the present invention to the dye is preferably 1% or more by weight, while more preferably 5% or more by weight, relative to the weight of the dye in the dye solution. The upper limit thereof is preferably 100% or less by weight, while more preferably 70% or less by weight. The dye and the dye composition including the dye dispersing agent may be used as an ink or a paint in various materials in the dyeing use. The dye composition may contain an arbitrary additive in accordance with the use thereof.

When the composition (2) according to the present invention is used as the dispersing agent for a hydraulic composition, this can constitute the hydraulic composition according to the present invention. Therefore, this will be explained hereinafter.

[Hydraulic Composition]

The hydraulic composition according to the present invention includes a hydraulic material and the dispersing agent (2) as described above. The hydraulic composition can be classified into a cement composition such as a cement and a gypsum, and into a hydraulic composition other than the former. Any of them may be used. When water is not included therein, the composition may be used as a premixed concrete.

The hydraulic composition can further contain, as needed, a fine aggregate (such as sand) and a rough aggregate (such as crushed stone). Illustrative examples of the hydraulic material include a cement paste, a mortar, a concrete, and a plaster.

Details of the cement composition, the gypsum composition, and other additive are the same as those described in the dispersing agent (1), and thus, explanation thereof is omitted.

4-2. Dispersing Agent (2) Including the Other Embodiment of the Composition (2)

The body to be dispersed that is dispersed by using the dispersing agent (2) including the other embodiment of the composition (2) described above is not particularly restricted. There may be mentioned various organic substances and inorganic substances.

Illustrative Examples of the Organic Substance Include:
organic pigments such as a fast yellow, a disazo yellow, a disazo orange, a naphthol red, a copper phthalocyanine type pigment, a phosphomolybdotungstate salt, a tannate salt, a katanol, a tamol rake, an isoindolinone yellow greenish, an isoindolinone yellow reddish, a quinacridone, a dioxane violet, a perinone orange, a perylene vermilion, a perylene scarlet, a perylene red, and perylene maroon;
synthetic resins such as polycarbonate, polyvinyl chloride, polymethyl methacrylate, and fluorinated resin; and
metal soaps such as aluminum stearate, zinc stearate, calcium stearate, magnesium stearate, composite of zinc stearate and calcium stearate, lead stearate, cadmium stearate, barium stearate, calcium laurate, and zinc laureate.

The average particle diameter of the organic substance is generally 100 μm or less, while preferably 0.1 to 50 μm. The organic substances may be used singly, or as a mixture of two or more of them.

Illustrative Examples of the Inorganic Substance Include:
silicate salts such as kaolin, aluminum silicate, clay, talc, mica, calcium silicate, sericite, and bentonite; carbonate salts such as calcium carbonate, magnesium carbonate, barium carbonate, and basic lead carbonate; sulfate salts such as calcium sulfate and barium sulfate;
chromate salts such as strontium chromate and pigment yellow;
molybdate salts such as zinc molybdate, calcium molybdate, and magnesium molybdate;
metal oxides such as alumina, antimony oxide, titanium oxide, cobalt oxide, triiron tetraoxide, diiron trioxide, trilead tetraoxide, lead monoxide, chromium oxide green, tungsten trioxide, and yttrium oxide;
metal hydroxides such as aluminum hydroxide, magnesium hydroxide, calcium hydroxide, iron hydroxide, and metatitanic acid;
metal carbides such as silicon carbide, tungsten carbide, boron carbide, and titanium carbide; and aluminum nitride, silicon nitride, born nitride, zirconia, barium titanate, satin white, carbon black, graphite, chrome yellow, mercury sulfide, ultramarine, Paris blue, titanium yellow, chrome vermilion, lithopone, copper acetoarsenite, copper, nickel, silver, palladium, and lead titanate zirconate.

The average particle diameter of the inorganic substance is generally 100 μm or less, while preferably 0.1 to 50 μm. These inorganic substances may be used singly, or as a mixture of two or more of them.

The form of the body to be dispersed is not particularly restricted. Illustrative examples thereof include a powder form, a particle form, a granular form, a fibrous form, and a plate form.

The dispersing medium that can be used when the body to be dispersed (for example, the organic substance and/or the inorganic substance as described before) is dispersed by using the dispersing agent (2) according to the present invention is not particularly restricted.
Illustrative Examples Thereof Include:
water;
fuel oils such as a lamp oil, a light oil, and a kerosene;
aliphatic hydrocarbons such as hexane, isohexane, cyclohexane, methyl cyclohexane, and isooctane;
aromatic hydrocarbons such as benzene, toluene, xylene, and cresol;
alcohols such as ethanol, methanol, isopropyl alcohol, butyl alcohol, and pentyl alcohol;
esters such as ethyl acetate and dioctyl phthalate;
ethers such as diethylene glycol, triethylene glycol, tetraethylene glycol, polyethylene glycol, polypropylene glycol, ethylene glycol monobutyl ether, carbitol, monoglyme, diglyme, tetraglyme, methyl cellosolve, and butyl cellosolve;
diols such as ethylene glycol, propylene glycol, butanediol, pentanediol, and hexanediol;
halogenated hydrocarbons such as 1,1,1-trichloroethane, trichloroethylene, dichloroethylene, and chlorodifluoromethane;
ketones such as methyl isoamyl ketone, methyl isobutyl ketone, acetone, and methyl ethyl ketone; and
terpineol, liquid paraffin, mineral sprit, N-(2-hydroxyethyl)pyrrolidone, and glycerin.

Among the dispersing media described above, water is preferable. These dispersing media may be used singly, or two or of them may be used concurrently.

Use Method of the Other Embodiment of the Dispersing Agent (2)

The use method of the dispersing agent (2) according to the present invention is not particularly restricted. For example, after the dispersing agent (2) according to the present invention is mixed with a dispersing medium, the body to be dispersed may be added into this mixture, or the dispersing agent (2) according to the present invention and the body to be dispersed may be simultaneously added into a dispersing medium, or after the body to be dispersed is mixed with a dispersing medium in advance, the dispersing agent (2) according to the present invention may be added into this mixture.

The use amount of the dispersing agent (2) according to the present invention is not particularly restricted. The amount may be appropriately controlled in accordance with the kind and the amount of the body to be dispersed. For example, the amount is preferably 0.01 to 10 parts by weight, while more preferably 0.1 to 5 parts by weight, relative to 100 parts by weight of the body to be dispersed.

The use amount of the dispersing medium is usually 20 to 1,000 parts by weight, relative to 100 parts by weight of the body to be dispersed.

The content of the lignin derivative, which is the active component in the dispersing agent (2) according to the present invention is preferably 25 to 100% by weight, while more preferably 50 to 100% by weight, relative to the total weight of the dispersing agent. The dispersing agent (2) according to the present invention may be blended with a heretofore known additive other than the lignin derivative, which is the active component in the present invention, so far as the purpose thereof is not impaired.

[Use of the Dispersing Agent (2)]

The dispersing agent (2) according to the present invention may be used in various uses described before. Illustrative examples thereof include a dispersing agent for the hydraulic composition, a dispersing agent for the oil field drilling mud, a dye dispersing agent, a chelating agent, a cleaning agent, a coagulant, a thickener, a coating material, a paint, an adhesive, and a water-absorbing resin. Among these, the dispersing agent for the hydraulic composition, the dispersing agent for the oil field drilling mud, and the dye dispersing agent are preferable, while the dispersing agent for the hydraulic composition is more preferable.

[Dispersing Agent for the Hydraulic Composition]

Hereinafter, the case that the dispersing agent according to the present invention is used as the dispersing agent for the hydraulic composition will be explained in detail.

The use form of the dispersing agent for the hydraulic composition is not particularly restricted. For example, this may be used in the form of an aqueous solution. When the dispersing agent according to the present invention is used as the dispersing agent for the hydraulic composition, the dispersing agent may be previously blended with a cement composition not containing water such as a cement powder or a dry mortar so as to make it a premix product to be used for a plaster work, a floor finishing, a grout, or the like, or alternatively, this may be blended at the time when the cement composition is kneaded.

Illustrative examples of the body to be dispersed when the dispersing agent according to the present invention is used as the dispersing agent for the hydraulic composition include various hydraulic materials. The hydraulic material can be classified into a cement composition such as a cement and a gypsum, and a hydraulic material other than the former. The hydraulic material may be any of these. The dispersing agent according to the present invention can constitute, as the dispersing agent for the hydraulic composition, the hydraulic composition together with the hydraulic material and water. The hydraulic composition may further include, as needed, a fine aggregate (such as sand) and a rough aggregate (such as crushed stone). Illustrative examples of the hydraulic material include a cement paste, a mortar, a concrete, a gypsum, and a plaster.

Details of the cement composition, the gypsum composition, and other additives are omitted because they are the same as the contents described in the dispersing agent (1).

EXAMPLES

Hereinafter, the present invention will be explained in detail by Examples. Because Examples described below are to suitably explain the present invention, they are not to restrict the present invention. Note that the measurement methods of physical properties and the like are those measurement methods described before unless otherwise specifically described. In Examples, the term "%" means % by weight and the term "part" means part by weight, unless otherwise specifically described.

First Embodiment

[Thermal decomposition point (° C.)]: this was measured by using a thermogravimetric differential thermal analyzer (TG-DTA) (trade name of "STA 7200", manufactured by Seiko Instruments Inc.) with the procedure described below.

Firstly, 10 g as a solid portion basis of a granular composition or of a target sample was dried and solidified at 105° C. Next, about 10 mg of the sample thus solidified was heated under a nitrogen atmosphere (nitrogen gas introduction rate of 100 mL/minute) from 50° C. to 600° C. with the temperature raising rate of 10° C./minute. The temperature at the time when the weight reduction rate of the sample was the largest was taken as the thermal decomposition point. The measurement was done 3 times for every sample and the average value thereof was taken.

In the case that the target sample was the polycarboxylic acid, either the method in which the sample was dried and solidified at −20° C. for 1 day by using a freeze dryer (trade name of "FDU-1200", manufactured by Tokyo Rikakikai Co., Ltd.), or the method in which the sample was dried and solidified at 105° C. for 1 day by using a fan dryer (trade name of "Fan Type Constant Temperature and Humidity Dryer DKM 600", manufactured by Yamato Scientific Co., Ltd.) was used. The rest of drying was done at 180° C. by using a spray dryer (trade name of "TR 120", manufactured by Preci Co., Ltd.).

[Thermal weight reduction rate (%)]: this was measured by using a thermogravimetric differential thermal analyzer (TG-DTA) (trade name of "STA 7200", manufactured by Seiko Instruments Inc.) with the procedure described below.

Firstly, 10 g as a solid portion basis of a granular composition or of a target sample was dried and solidified at 105° C. Next, about 10 mg of the sample thus solidified was heated under a nitrogen atmosphere (nitrogen gas introduction rate of 100 mL/minute) from 50° C. to 600° C. with the temperature raising rate of 10° C./minute. The weight reduction rate of the sample until 600° C. was taken as the thermal weight reduction rate. The measurement was done 3 times for every sample; and the average value thereof was taken.

In the case that the target sample was the polycarboxylic acid, the method in which the sample was dried and solidified at −20° C. for 1 day by using a freeze dryer (trade name of "FDU-1200", manufactured by Tokyo Rikakikai Co., Ltd.), or the method in which the sample was dried and solidified at 105° C. for 1 day by using a fan dryer (trade name of "Fan Type Constant Temperature and Humidity Dryer DKM 600", manufactured by Yamato Scientific Co., Ltd.) was used. The rest of drying was done at 180° C. by using a spray dryer (trade name of "TR 120", manufactured by Preci Co., Ltd.).

[Weight-average molecular weight]: this was measured in terms of polyethylene glycol by means of a gel permeation chromatography (GPC). Details of the measurement condition of GPC are described below:

measurement instrument: manufactured by Tosoh Corp.,
used column: Shodex Column OH-pak SB-806HQ, SB-804HQ, and SB-802.5HQ,
eluting solution: 0.05 mM sodium nitrate/acetonitrile (8/2 (v/v)),
standard substance: polyethylene glycol (manufactured by Tosoh Corp. or by GL Science Inc.), and
detector: differential refractometer (manufactured by Tosoh Corp.).

Example 1-1: Production of the Granular Composition (1)

Water (229 g), 92 g of poly(ethyleneoxide) monophenyl ether (addition mole number of EO: 50), 60 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, the temperature of the reaction mixture was dropped to 90° C.; and then, 93 g of an aqueous 250 g/L calcium hydroxide solution and 24 g of an aqueous 31% sodium hydroxide solution were added to the reaction vessel, which was then followed by further stirring for 1 hour. The resulting mixture was filtrated to remove the gypsum that was formed by neutralization to obtain a lignin derivative including a copolymer having a weight-average molecular weight of 41,300. The reaction weight ratio of the lignin sulfonic acid-based compound [L] to the water-soluble compound [M], [L]/[M], was 39/61, and the reaction rate of the water-soluble compound was 95%. This lignin derivative was dried at 180° C. by using a spray dryer (trade name of "TR 120", manufactured by Preci Co., Ltd.) to obtain the granular composition (1) according to the present invention as a solid product.

The thermal decomposition point of the granular composition (1) was 395° C. and the thermal weight reduction rate thereof was 68%.

Example 1-2: Production of the Granular Composition (2)

Water (275 g), 69 g of poly(ethyleneoxide) monophenyl ether (addition mole number of EO: 50), 150 g of Sunflow RH (lignin sulfonate salt; manufactured by Nippon Paper Industries Co., Ltd.), 12 g of an aqueous 37% formaldehyde solution, 40 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 10 hours with the liquid temperature of 105° C. After the reaction solution was cooled, 85 g of an aqueous 250 g/L calcium hydroxide solution was added to the reaction vessel. The resulting mixture of these was filtrated to remove the gypsum that was formed by neutralization to obtain a lignin derivative including a copolymer having a weight-average molecular weight of 22,800. The reaction weight ratio of the lignin sulfonic acid-based compound [L] to the water-soluble compound [M], [L]/[M], was 68/32, and the reaction rate of the water soluble compound was 89%. This lignin derivative was dried at 180° C. by using a spray dryer (trade name of "TR 120", manufactured by Preci Co., Ltd.) to obtain the granular composition (2) according to the present invention as a solid product.

The thermal decomposition point of the granular composition (2) was 390° C. and the thermal weight reduction rate thereof was 68%.

Example 1-3: Production of the Granular Composition (3)

The lignin sulfonic acid (trade name of "Sunflow RH"; manufactured by Nippon Paper Industries Co., Ltd.) (175 g as an as-is basis and 70 g as a solid portion basis) was mixed with 120 g as an as-is basis and 30 g as a solid portion basis of the polycarboxylic acid type dispersing agent (trade name of "SF-500R"; manufactured by Flowric Co., Ltd.); and then, the resulting mixture was dried at 180° C. by using a spray dryer (trade name of "TR 120", manufactured by Preci Co., Ltd.) to obtain the granular composition (3) according to the present invention as a solid product.

The weight ratio of the lignin sulfonic acid-based compound [L] to the water-soluble compound [M], [L]/[M], was 70/30.

The thermal decomposition point of the granular composition (3) was 236° C. and the thermal weight reduction rate thereof was 65%.

Comparative Example 1-1: Production of the Reference Sample (1)

Naphthalene sulfonic acid (trade name of "Sunflow PS"; manufactured by Nippon Paper Industries Co., Ltd.) was dried at 180° C. by using a spray dryer (trade name of "TR 120", manufactured by Preci Co., Ltd.) to obtain the reference sample (1) as a solid product.

The thermal decomposition point of the reference sample (1) was 495° C. and the thermal weight reduction rate thereof was 20%.

Comparative Example 1-2: Production of the Reference Sample (2)

Water (733 parts) was charged into a glass reaction vessel equipped with a thermometer, a stirring device, a refluxing device, a nitrogen introducing tube, and a dropping device; and then, after inside the reaction vessel was purged with nitrogen with stirring, the temperature thereof was raised to 100° C. under a nitrogen atmosphere. Then, an aqueous monomer solution of 21 parts of methacrylic acid, 30 parts of acrylic acid, and 92 parts of methoxypolyethylene glycol methacrylate (average addition mole number of ethylene oxide: 25) mixed in 70 parts of water, and a mixed solution of 3 parts of ammonium persulfate with 87 parts of water each were continuously added dropwise over 2 hours into the reaction vessel the temperature of which was kept at 50° C. The reaction was further continued for 1 hour while keeping the temperature at 50° C. The pH of the aqueous solution of the polycarboxylic acid type dispersing agent thus obtained was adjusted to 7 with an aqueous 31% NaOH solution. The weight-average molecular weight of the polycarboxylic acid type dispersing agent in the solution was 18,300 (Mw/Mn: 1.6). This polycarboxylic acid type dispersing agent was dried at −20° C. by using a freeze dryer (trade name of "FDU-1200", manufactured by Tokyo Rikakikai Co., Ltd.) to obtain the reference sample (2) as a solid product. The thermal decomposition point of the reference sample (2) was 405° C. and the thermal weight reduction rate thereof was 85%.

Comparative Example 1-3: Production of the Reference Sample (3)

The polycarboxylic acid type dispersing agent (trade name of "SF-500R"; manufactured by Flowric Co., Ltd.) was dried at 105° C. for 1 day by using a dryer (trade name of "Fan Type Constant Temperature and Humidity Dryer DKM 600", manufactured by Yamato Scientific Co., Ltd.) to obtain the reference sample (3) as a solid product.

The thermal decomposition point of the reference sample (3) was 335° C. and the thermal weight reduction rate thereof was 88%.

Comparative Example 1-4: Production of the Reference Sample (4)

Lignin sulfonic acid (trade name of "Sunflow RH"; manufactured by Nippon Paper Industries Co., Ltd.) was dried at 180° C. by using a spray dryer (trade name of "TR 120", manufactured by Preci Co., Ltd.) to obtain the reference sample (4) as a solid product.

The thermal decomposition point of the reference sample (4) was 310° C. and the thermal weight reduction rate thereof was 47%.

<Concrete Test>

The concrete (the cement composition and the hydraulic composition) added with the granular composition or with the reference sample of each of Examples 1-1 to 1-3 and Comparative Examples 1-1 to 1-4 was prepared by the procedure described below. The concrete thus obtained was subjected to the slump test.

Concrete Test Procedure and Evaluation Method: Examples 1-1 to 1-3 and Comparative Examples 1-1 to 1-4

The rough aggregate, the fine aggregate, and the cement, which were blended as described in Table 1, was charged into a forced biaxial mixer; and this was mechanically kneaded for 10 seconds under a high temperature environment assuming a summer condition (40° C.). Next, water and the granular composition or the reference sample (initial addition) described in Table 2 were added with the amounts thereof described in Table 2, and then, they were kneaded for 90 seconds. After this, part of the concrete was discharged and subjected to a fresh concrete test (slump test JIS A 1101: the spread of the fresh concrete was measured as a flow value) for an initial concrete evaluation. Then, the concrete thereby prepared was allowed to statically leave for a prescribed period under a high temperature environment (40° C.); and thereafter (after 15 minutes, 30 minutes, or 45 minutes), the fresh concrete test described above was carried out. The results thereof are summarized in Table 2.

TABLE 1

| W/C | Unit weight (kg/m$^3$) | | | | | |
|---|---|---|---|---|---|---|
| (%) | W | C | S1 | S2 | G1 | G2 |
| 46.8 | 180 | 385 | 471 | 470 | 394 | 394 |

Details of the symbols in Table 1 are as follows.
C: Equal amounts of the following 3 cements were mixed.
Normal Portland cement (specific gravity of 3.16: manufactured by Ube-Mitsubishi Cement Corp.)
Normal Portland cement (specific gravity of 3.16: manufactured by Taiheiyo Cement Corp.)
Normal Portland cement (specific gravity of 3.16: manufactured by Tokuyama Corp.)
W: Tapped water
S1: Sand of crushed limestone originated from Tsukumi in Oita Prefecture (fine aggregate with specific gravity of 2.66)
S2: Sand of crushed stone originated from Shunan in Yamaguchi Prefecture (fine aggregate with specific gravity of 2.66)
G1, G2: Crushed stones originated from Iwakuni in Yamaguchi Prefecture (rough aggregate with specific gravity of 2.73 (G1) and 2.66 (G2))

TABLE 2

| | | | | | Addition amount | Slump flow (mm) | | | |
|---|---|---|---|---|---|---|---|---|---|
| | | | | | (% by weight) | 0 min | 15 min | 30 min | 45 min |
| Example | 1-1 | Granular composition (1) | Thermal decomposition point (° C.) | 395 | 0.9 | 436 | 389 | 350 | 310 |
| | | | Thermal weight reduction rate (%) | 68 | | | | | |
| | 1-2 | Granular composition (2) | Thermal decomposition point (° C.) | 390 | 1.0 | 420 | 366 | 344 | 315 |
| | | | Thermal weight reduction rate (%) | 68 | | | | | |
| | 1-3 | Granular composition (3) | Thermal decomposition point (° C.) | 236 | 1.0 | 409 | 384 | 405 | 377 |
| | | | Thermal weight reduction rate (%) | 65 | | | | | |
| Comparative Example | 1-1 | Reference sample (1) | Thermal decomposition point (° C.) | 495 | 0.9 | 417 | 304 | 227 | 205 |
| | | | Thermal weight reduction rate (%) | 20 | | | | | |
| | 1-2 | Reference sample (2) | Thermal decomposition point (° C.) | 405 | 0.5 | 443 | 248 | 214 | 210 |
| | | | Thermal weight reduction rate (%) | 85 | | | | | |
| | 1-3 | Reference sample (3) | Thermal decomposition point (° C.) | 335 | 0.7 | 402 | 324 | 236 | 218 |
| | | | Thermal weight reduction rate (%) | 88 | | | | | |
| | 1-4 | Reference sample (4) | Thermal decomposition point (° C.) | 310 | 2.0 | 419 | 280 | 229 | 209 |
| | | | Thermal weight reduction rate (%) | 47 | | | | | |

The numeral values of the addition amounts in Table 2 are the solid portion weight (%) of the granular composition or of the reference sample, relative to the cement weight.

From Table 2, the following points may be noted. The granular compositions (1) to (3), with a thermal weight reduction rates of 65% or 68%, were not only excellent in the heat resistance but also excellent in the dispersibility under a high temperature environment of 40° C. assuming a summer condition (see, Examples 1-1 to 1-3). In particular, the granular compositions further including the lignin derivatives had the thermal decomposition points of 395° C. or 390° C., indicating that the heat resistance can be enhanced without causing deterioration in the dispersibility due to resignification (see, Examples 1-1 and 1-2).

On the other hand, the reference samples (1) to (4) having the solidified heretofore known dispersing agents exhibited a low thermal weight reduction rate of 20% or 47%, indicating deterioration in the dispersibility due to inevitably contaminated impurities (see, Comparative Examples 1-1 and 1-4), or exhibited an excessively high thermal weight reduction rate of 85% or 88%, indicating poor heat resistance (see, Comparative Examples 1-2 and 1-3). Also, the thermal decomposition points were as low as 310° C. or 335° C., indicating a poor heat resistance (see, Comparative Examples 1-3 and 1-4), or as high as 405° C. or 495° C., indicating a poor dispersibility due to resignification (see, Examples 1-1 and 1-2).

Second Embodiment

[Particle size distribution]: 3 g of each powder sample was measured under a dry condition by using a laser diffraction type particle size distribution measurement instrument (Mastersizer 3000; manufactured by Malvern Panalytical Ltd.) to obtain a molecular weight distribution and the particle size distribution was calculated by expressing the particle diameter (μm) in the horizontal axis and the volume (%) in the vertical axis.

[Average particle diameter (μm)]: from the particle size distribution, the average particle diameter was determined at the point where the accumulated area reached 50%.

[Tapped apparent specific gravity (g/mL)]: 10 to 15 g of the granular composition was taken into a test tube having measuring marks (volume of 20 mL). The test tube was vibrated 50 times (40 rotations/min.) with a dropping height of 5 cm by using a specific volume measurement instrument (manufactured by Ishiyama Scientific Instruments Co., Ltd.) to measure the volume in the test tube. By substituting the measurement results into the following formula, the tapped apparent specific gravity was calculated.

Formula: tapped apparent specific gravity (g/mL)=mass of granular composition (g)/volume in test tube after vibration (mL)

Production Example 1: Production of the Granular Composition (1)

Water (229 g), 92 g of poly(ethyleneoxide) monophenyl ether (addition mole number of EO: 50), 60 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, the temperature of the reaction mixture was dropped to 90° C.; and then, 93 g of an aqueous 250 g/L calcium hydroxide solution and 24 g of an aqueous 31% sodium hydroxide solution were added to the reaction vessel, which was then followed by further stirring for 1 hour. The resulting mixture of these was filtrated to remove the gypsum that was formed by neutralization to obtain, as an aqueous solution, a lignin derivative (2-1) including a copolymer having a weight-average molecular weight of 41,300.

This lignin derivative (2-1) was dried at 180° C. by using a spray dryer (trade name of "TR 120", manufactured by Preci Co., Ltd.) to obtain the granular composition (1) according to the present invention as a solid product. The chart of the particle size distribution of the granular composition (1) thereby obtained is exhibited in FIG. 1. The reaction weight ratio of the lignin sulfonic acid-based compound [L] to the aromatic water-soluble compound [M], [L]/[M], was 39/61, and the reaction rate of the aromatic water-soluble compound was 95%.

Production Example 2: Production of the Granular Composition (2)

Water (275 g), 69 g of poly(ethyleneoxide) monophenyl ether (addition mole number of EO: 50), 150 g of Sunflow RH (lignin sulfonate salt; manufactured by Nippon Paper Industries Co., Ltd.), 12 g of an aqueous 37% formaldehyde solution, 40 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 10 hours with the liquid temperature of 105° C. After the reaction solution was cooled, 85 g of an aqueous 250 g/L calcium hydroxide solution was added to the reaction vessel. The resulting mixture of these was filtrated to remove the gypsum that was formed by neutralization to obtain, as an aqueous solution, a lignin derivative (2-2) including a copolymer having a weight-average molecular weight of 22,800.

This lignin derivative (2-2) was dried at 180° C. by using a spray dryer (trade name of "TR 120", manufactured by Preci Co., Ltd.) to obtain the granular composition (2) according to the present invention as a solid product. The chart of the particle size distribution of the granular composition (2) thereby obtained is exhibited in FIG. 2. The reaction weight ratio of the lignin sulfonic acid-based compound [L] to the aromatic water-soluble compound [M], [L]/[M], was 68/32, and the reaction rate of the aromatic water-soluble compound was 89%.

Example 2-1

The granular composition (1) that was produced in Production Example 1 was used.

Example 2-2

The granular composition (2) that was produced in Production Example 2 was used.

Comparative Example 2-1

Sunflow RH (modified lignin sulfonic acid-based compound manufactured by Nippon Paper Industries Co., Ltd.)

was used as the conventional lignin-based dispersing agent (a). The chart of the particle size distribution of the Sunflow RH is exhibited in FIG. 3.

Figure 2:
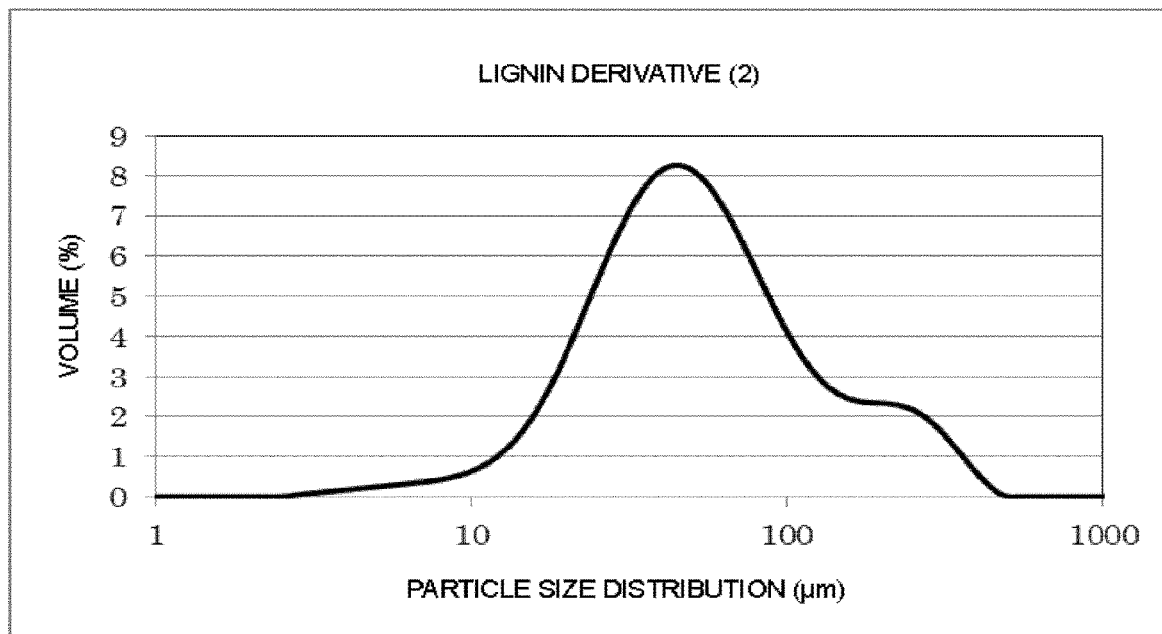
FIG. 2 is a chart illustrating a particle size distribution of the lignin derivative (2) that is produced in Production Example 2.
Figure 3:
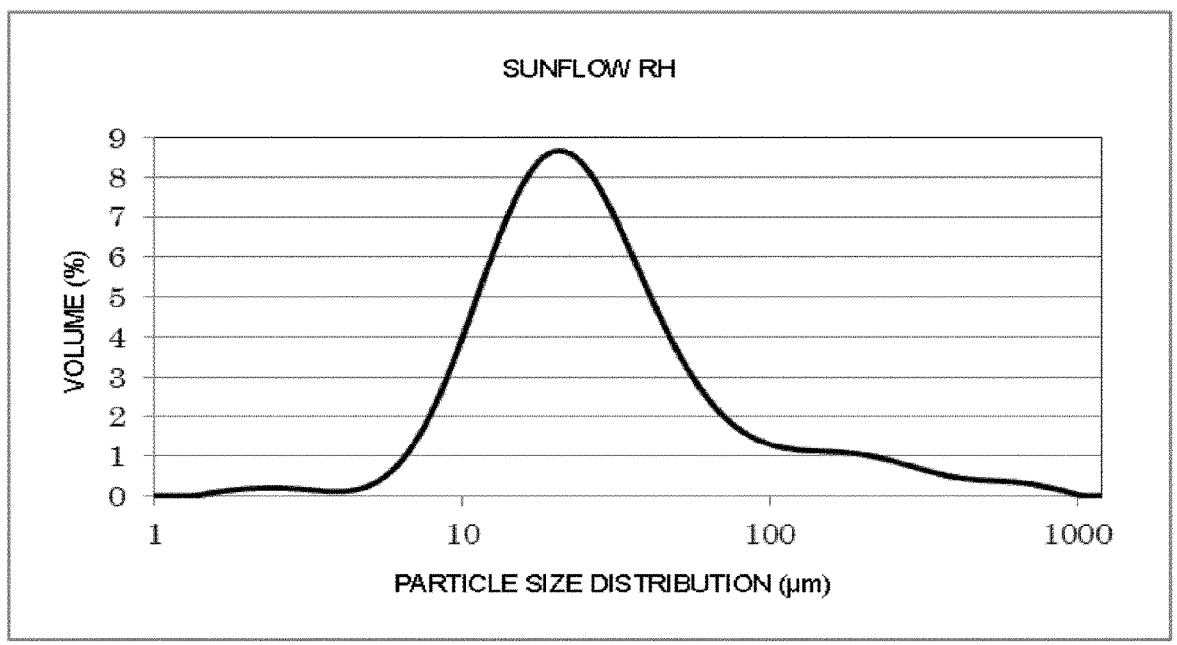
FIG. 3 is a chart illustrating a particle size distribution of Sunflow RH, which is a commercially available product.

The average particle diameter values obtained from the particle size distributions in FIG. 1 to FIG. 3, the accumulate area values of the particle diameter of 100 μm or less in the particle size distribution, and the tapped apparent specific gravity values are summarized in Table 3.

TABLE 3

|  | Example 2-1 | Example 2-2 | Comparative Example 2-1 |
|---|---|---|---|
| Average particle diameter (μm) | 51.4 | 49.7 | 24.0 |
| Accumulated area of 100 μm or less in particle size distribution (%) | 77.9 | 78.5 | 89.3 |
| Tapped apparent specific gravity (g/mL) | 0.33 | 0.51 | 0.45 |

Examples 2-3 to 2-4, Comparative Example 2-2, and Reference Examples 2-1 to 2-2: Dispersing Agent Test The cement composition (mortar) added with each sample of Examples 2-1 to 2-2, Comparative Example 2-1, the aqueous solution of the lignin derivative (2-1), and the aqueous solution of the lignin derivative (2-2) was prepared by the procedure described below. The sand, the cement and water which were blended as described in Table 4 (W/C=45%) and each sample with the amounts described in Table 5 were charged into a forced biaxial mixer at an ambient temperature (20° C.); and this blend was mechanically kneaded for 90 seconds by means of the forced biaxial mixer to obtain a cement composition. When a powder sample was used, a small portion of the water described in Table 4 was taken in advance; and then, this water was added to the mixture obtained after the cement, the sand, and each sample were mixed (premix). The cement composition thereby obtained was subject to the slump test in accordance with the following procedure. The evaluation results are summarized in Table 5.

[Slump test]: this was measured in accordance with JIS A 1101 (the drop distance from the peak of a fresh cement composition was measured as a slump value; and the spread width thereof was measured as a flow value). The elapsed time is the time that is elapsed since immediately after the composition is discharged from the forced biaxial mixer.

TABLE 4

| W/C | Unit weight (g) | | |
|---|---|---|---|
| (%) | W | C | S |
| 45 | 308 | 684 | 1781 |

Notes of Table 4:
C: Equal amounts of the following 3 cements are mixed.
Normal Portland cement (specific gravity of 3.16: manufactured by Ube-Mitsubishi Cement Corp.)
Normal Portland cement (specific gravity of 3.16: manufactured by Taiheiyo Cement Corp.)
Normal Portland cement (specific gravity of 3.16: manufactured by Tokuyama Corp.)
W: Tapped water
S: Mountain sand originated from Kakegawa (fine aggregate with specific gravity of 2.57)

TABLE 5

|  |  | Addition amount | Elapsed time (min) | | | |
|---|---|---|---|---|---|---|
|  | Cement dispersing agent | (% by weight) | 0 | 15 | 30 | 60 |
|  |  |  | SL value (mm) | | | |
| Example 2-3 | Granular composition (1) | 0.35 | 218 | 193 | 163 | 124 |
| Example 2-4 | Granular composition (2) | 0.38 | 220 | 195 | 168 | 122 |
| Comparative Example 2-2 | Sunflow RH powder | 0.40 | 192 | 110 | — | — |
| Reference Example 2-1 | Aqueous solution of lignin derivative (2-1) | 0.35 | 191 | 100 | — | — |
| Reference Example 2-2 | Aqueous solution of lignin derivative (2-2) | 0.38 | 195 | 105 | — | — |

Notes of Table 5:
Addition amount (% by weight): addition amount of the solid portion in the cement dispersing agent relative to 100% by weight of the cement composition
SL: slump value (cm)

From Table 5, the following points are clear. When the granular composition (1) or (2) according to the present invention was used, the slump values immediately after the addition, after 15 minutes, after 30 minutes, and after 60 minutes were about 220 cm, about 195 cm, about 165 cm, and about 123 cm, respectively, indicating that the dispersibility of the water-hardening material was able to be retained (see, Examples 2-3 and 2-4). On the other hand, when the existing lignin sulfonic acid type dispersing agent was added as the form of powder, the slump value immediately after the addition was 192 cm, and thus the dispersibility of the hydraulic material was able to be observed; but the slump value after 15 minutes was 110 cm, indicating that the dispersibility of the hydraulic material was eminently deteriorated (see, Comparative Example 2-2).

Without drying to the granular composition, when the lignin derivative was added in the liquid state of an aqueous solution, the slump value immediately after the addition was about 193 cm, and thus, the dispersibility of the hydraulic material was able to be observed; but the slump value after 15 minutes was about 102.5 cm, indicating that the dispersibility of the hydraulic material was eminently deteriorated (see, Comparative Examples 2-1 to 2-2).

From these results, the granular composition according to the present invention exhibits better dispersibility than the existing lignin sulfonic acid type dispersing agent; on top of this, when this is used as a powder, not only the initial dispersibility but also the dispersibility after elapse of time can be enhanced.

Third Embodiment

Example 3-1: Production of the Lignin Derivative (1)

Water (236 g), 92 g of poly(ethyleneoxide) monophenyl ether (addition mole number of EO: 100), 5 g of p-hydroxy benzoic acid, 11 g of aniline sulfonic acid, 60 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 10 hours with the liquid temperature of 105° C. After completion of the reaction, 93 g of an aqueous 250 g/L calcium hydroxide solution and 24 g of an aqueous 31% sodium hydroxide solution were added to the reaction vessel, which was then followed by further stirring for 1 hour. The resulting mixture of these was filtrated to remove the gypsum that was formed by neutralization to obtain a liquid product of the lignin derivative (1) including a copolymer having a weight-average molecular weight of 45,300.

Example 3-2: Production of the Lignin Derivative (2)

Water (229 g), 92 g of poly(ethyleneoxide) monophenyl ether (addition mole number of EO: 50), 60 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, the temperature of the reaction mixture was dropped to 90° C.; and then, 93 g of an aqueous 250 g/L calcium hydroxide solution and 24 g of an aqueous 31% sodium hydroxide solution were added to the reaction vessel, which was then followed by further stirring for 1 hour. The resulting mixture of these was filtrated to remove the gypsum that was formed by neutralization to obtain a liquid product of the lignin derivative (2) including a copolymer having a weight-average molecular weight of 41,300.

Example 3-3: Production of the Lignin Derivative (3)

Water (283 g), 92 g of poly(ethyleneoxide) monophenyl ether (addition mole number of EO: 25), 80 g of Sunflow RH (lignin sulfonate salt; manufactured by Nippon Paper Industries Co., Ltd.), 12 g of an aqueous 37% formaldehyde solution, 72 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 10 hours with the liquid temperature of 105° C. After the reaction solution was cooled, 95 g of an aqueous 250 g/L calcium hydroxide solution and 25 g of an aqueous 31% sodium hydroxide solution were added to the reaction vessel. The resulting mixture of these was filtrated to remove the gypsum that was formed by neutralization to obtain a liquid product of the lignin derivative (3) including a copolymer having a weight-average molecular weight of 26,900.

Example 3-4: Production of the Lignin Derivative (4)

Water (229 g), 92 g of poly(propyleneoxide) monophenyl ether (addition mole number of PO: 130), 22 g of Sunflow RH (lignin sulfonate salt; manufactured by Nippon Paper Industries Co., Ltd.), 10 g of p-hydroxy benzoic acid, 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, the temperature of the reaction mixture was dropped to 90° C.; and then, 54 g of an aqueous 31% sodium hydroxide solution was added to the reaction vessel, which was then followed by further stirring for 1 hour. The resulting mixture of these was filtrated to remove the gypsum that was formed by neutralization to obtain a liquid product of the lignin derivative (4) including a copolymer having a weight-average molecular weight of 21,200.

Example 3-5: Production of the Lignin Derivative (5)

Water (229 g), 92 g of poly(ethyleneoxide) monophenyl ether (addition mole number of EO: 50), 60 g of Pearllex NP (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 3 hours with the liquid temperature of 105° C. After completion of the reaction, 72 g of an aqueous 250 g/L calcium hydroxide solution and 24 g of an aqueous 31% sodium hydroxide solution were added to the reaction vessel, which was then followed by further stirring for 1 hour. The resulting mixture of these was filtrated to remove the gypsum that was formed by neutralization to obtain a liquid product of the lignin derivative (5) including a copolymer having a weight-average molecular weight of 39,700.

Example 3-6: Production of the Lignin Derivative (6)

Water (229 g), 82 g of poly(ethyleneoxide) monophenyl ether (addition mole number of EO: 50), 70 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 120° C. with stirring under a pressurized condition. The reaction was completed after 2 hours with the liquid temperature of 120° C. After completion of the reaction, the temperature of the reaction mixture was dropped to 50° C.; and then, 93 g of an aqueous 250 g/L calcium hydroxide solution and 24 g of an aqueous 31% sodium hydroxide solution were added to the reaction vessel, which was then followed by further stirring for 2 hours. The resulting mixture of these was filtrated to remove the gypsum that was formed by neutralization to obtain a liquid product of the lignin derivative (6) including a copolymer having a weight-average molecular weight of 34,400.

Example 3-7: Production of the Lignin Derivative (7)

Water (229 g), 122 g of poly(ethyleneoxide) monophenyl ether (addition mole number of EO: 70), 20 g of Vanillex HW (lignin sulfonate salt; manufactured by Nippon Paper Industries Co., Ltd.), 5 g of p-hydroxy benzoic acid, 13 g of an aqueous 37% formaldehyde solution, 58 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, 62 g of an aqueous 250 g/L calcium hydroxide solution and 39 g of an aqueous 31% sodium hydroxide solution were added to the reaction vessel, which was then followed by further stirring for 1 hour. The resulting mixture of these was filtrated to remove the gypsum that was formed by neutralization to obtain a liquid product of the lignin derivative (7) including a copolymer having a weight-average molecular weight of 16,800.

Example 3-8: Production of the Lignin Derivative (8)

Water (192 g), 52 g of poly(ethyleneoxide) monophenyl ether (addition mole number of EO: 70), 35 g of Sunflow RH (lignin sulfonate salt; manufactured by Nippon Paper Industries Co., Ltd.), 10 g of aniline sulfonic acid, 11 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 14 hours with the liquid temperature of 105° C. After completion of the reaction, 90 g of an aqueous 250 g/L calcium hydroxide solution and 24 g of an aqueous 31% sodium hydroxide solution were added to the reaction vessel, which was then followed by further stirring for 1 hour. The resulting mixture of these was filtrated to remove the gypsum that was formed by neutralization to obtain a liquid product of the lignin derivative (8) including a copolymer having a weight-average molecular weight of 29,900.

Example 3-9: Production of the Lignin Derivative (9)

Water (229 g), 43 g of poly(ethyleneoxide) monophenyl ether (addition mole number of EO: 25), 10 g of naphthalene, 90 g of SunEkis M (lignin sulfonate salt; manufactured by Nippon Paper Industries Co., Ltd.), 21 g of an aqueous 37% formaldehyde solution, 77 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The reaction was completed after 8 hours with the liquid temperature of 105° C. After completion of the reaction, 52 g of an aqueous 250 g/L calcium hydroxide solution and 34 g of an aqueous 31% sodium hydroxide solution were added to the reaction vessel, which was then followed by further stirring for 2 hours. The resulting mixture of these was filtrated to remove the gypsum that was formed by neutralization to obtain a liquid product of the lignin derivative (9) including a copolymer having a weight-average molecular weight of 18,300.

Example 3-10: Production of the Lignin Derivative (10)

Water (229 g), 92 g of poly(ethyleneoxide) monophenyl ether (addition mole number of EO: 70), 57 g of Sunflow RH (lignin sulfonate salt; manufactured by Nippon Paper Industries Co., Ltd.), 13 g of an aqueous 37% formaldehyde solution, 55 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The polymerization reaction was completed after 14 hours with the liquid temperature of 105° C. After completion of the reaction, the temperature of the reaction mixture was dropped to 90° C.; and then, 97 g of an aqueous 250 g/L calcium hydroxide solution and 19 g of an aqueous 31% sodium hydroxide solution were added to the reaction vessel, which was then followed by further stirring for 30 minutes. The resulting mixture of these was filtrated to remove the gypsum that was formed by neutralization to obtain a liquid product of the lignin derivative (10) including a copolymer having a weight-average molecular weight of 29,300.

Comparative Example 3-1: Lignin-Based Dispersing Agent (a)

Sunflow RH (modified lignin sulfonic acid-based compound; manufactured by Nippon Paper Industries Co., Ltd.) was used as the conventional lignin-based dispersing agent (a).

Comparative Example 3-2: Production of the Lignin Derivative (b)

In accordance with the description in National Publication of International Patent Application No. 2008-514402, 98.7 g of water, 152.4 g of polyethylene glycol mono(3-methyl-3-butenyl) ether (average addition mole number of ethylene oxide: 50), 0.3 g of acrylic acid, and 2.1 g of a craft lignin (item number: 37095-9, manufactured by Sigma-Aldrich Co. LLC) were charged into a glass reaction vessel equipped with a thermometer, a stirring device, a refluxing device, a nitrogen introducing tube, and a dropping device; and then, after inside the reaction vessel was purged with nitrogen with stirring, the temperature thereof was raised to 58° C. under a nitrogen atmosphere. After the temperature of the liquid reached 58° C., an aqueous solution having 0.5 g of an aqueous 30% hydrogen peroxide solution diluted with 6.3 g of water was added; and immediately after this, dropwise addition of an aqueous monomer solution having 9.2 g of acrylic acid diluted with 21.5 g of water and dropwise addition of 32.6 g of an aqueous chain-transfer agent solution having 0.2 g of L-ascorbic acid and, as a chain-transfer agent, 0.4 g of 3-mercaptopropionic acid mixed therein were started. The dropwise addition of the aqueous monomer solution was done during 3 hours, and the dropwise addition of the aqueous solution of the chain-transfer agent was done during 3.5 hours. After completion of the dropwise addition of the aqueous chain-transfer agent solution, the temperature of the reaction mixture was kept at 58° C. for further 2 hours to obtain a liquid product of the lignin derivative (b) including an aqueous solution of a copolymer having the average molecular weight of 33,000.

Comparative Example 3-3: Production of the Aromatic Water-Soluble Compound Homopolymer (c)

The procedure of Example 1 was repeated, except that Sunflow RH was not used, to obtain the aromatic water-soluble compound homopolymer (c) as an aqueous solution of a copolymer having a weight-average molecular weight of 31,800. The reaction rate of the aromatic water-soluble compound was 95%.

Comparative Example 3-4: Naphthalene Sulfonic Acid Type Dispersing Agent (d)

Sunflow PS (condensate of naphthalene sulfonic acid with formaldehyde; manufactured by Nippon Paper Industries Co., Ltd.) was used as the naphthalene sulfonic acid type dispersing agent (d).

Comparative Examples 3-5 and 3-6: Polycarboxylic Acid Type Dispersing Agents (e) and (f)

The commercially available Flowric SF-500S (manufactured by Flowric Co., Ltd.) was used as the polycarboxylic acid type dispersing agent (e), and the commercially available Flowric SF-500R (manufactured by Flowric Co., Ltd.) was used as the polycarboxylic acid type dispersing agent (f).

Comparative Examples 3-7: Production of the Lignin Derivative (11)

Water (229 g), 92 g of poly(ethyleneoxide) monophenyl ether (addition mole number of EO: 50), 59 g of Sunflow RH (lignin sulfonate salt; manufactured by Nippon Paper Industries Co., Ltd.), 13 g of an aqueous 37% formaldehyde solution, 20 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The polymerization reaction was completed after 6 hours with the liquid temperature of 105° C. After completion of the reaction, the temperature of the reaction mixture was dropped to 90° C.; and then, 35 g of an aqueous 250 g/L calcium hydroxide solution and 10 g of an aqueous 31% sodium hydroxide solution were added to the reaction vessel, which was then followed by further stirring for 30 minutes. The resulting mixture of these was filtrated to remove the gypsum that was formed by neutralization to obtain a liquid product of the lignin derivative (11) including a copolymer having a weight-average molecular weight of 18,200.

Comparative Examples 3-8: Production of the Lignin Derivative (12)

Water (208 g), 126 g of poly(ethyleneoxide) monophenyl ether (addition mole number of EO: 50), 14 g of Sunflow RH (lignin sulfonate salt; manufactured by Nippon Paper Industries Co., Ltd.), 10 g of an aqueous 37% formaldehyde solution, 41 g of an aqueous 72% sulfuric acid solution, and 0.05 g of an antifoaming agent Pronal 753 (manufactured by Toho Chemical Industry Co., Ltd.) were charged into a glass reaction vessel equipped with a thermometer, a stirring device, a refluxing device, and a dropping device; and then, the temperature of the reaction vessel was raised to 105° C. with stirring. The polymerization reaction was completed after 14 hours with the liquid temperature of 105° C. After completion of the reaction, the temperature of the reaction mixture was dropped to 90° C.; and then, 97 g of an aqueous 250 g/L calcium hydroxide solution and 19 g of an aqueous 31% sodium hydroxide solution were added to the reaction vessel, which was then followed by further stirring for 30 minutes. The resulting mixture of these was filtrated to remove the gypsum that was formed by neutralization to obtain an aqueous solution of the lignin derivative (12) including a copolymer having a weight-average molecular weight of 30,900.

In Table 6 are listed the used aromatic water-soluble compound, the reaction weight ratio of the lignin sulfonic acid-based compound [L] to the aromatic water-soluble compound [M] ([L]/[M]), the reaction rate (%) of the aromatic water-soluble compound, the B type viscosity (mPa·s) in the solution form in which a nonvolatile content at 100° C. is 30%, and the surface tension (dyne/cm) in the solution form in which a nonvolatile content at 100° C. is 10%, in each of the lignin derivatives (1) to (10) obtained in Examples 3-1 to 3-10, the lignin-based dispersing agent (a) of Comparative Example 3-1, the lignin derivative (b) obtained in Comparative Example 3-2, the aromatic water-soluble compound homopolymer (c) obtained in Comparative Example 3-3, the naphthalene sulfonic acid type dispersing agent of Comparative Example 3-4, the polycarboxylic acid type dispersing agents of Comparative Examples 3-5 to 3-6, and the lignin derivatives (11) to (12) obtained in Comparative Examples 3-7 to 3-8.

The measurement methods of the B type viscosity and of the surface tension are described below.

[Viscosity (mPa·s)]

Ion-exchanged water was added such that the nonvolatile component in the target sample might become 30% in a solution form at 100° C.; and then, 100 g of the solution thus prepared was measured by using a B type viscometer (trade name of "BL Type Viscometer", manufactured by Toki Sangyo Co., Ltd.) under the condition of 20° C. and 60 rpm using the #2 rotor.

[Surface Tension (Dyne/Cm)]

Ion-exchanged water was added such that the nonvolatile component in the target sample might become 10% in a solution form at 100° C.; and then, 100 g of the solution thus prepared was measured by using a surface tension measurement instrument (trade name of "CBVP-A3", manufactured by Kyowa Interface Science Co., Ltd.).

TABLE 6

| | | Name | Aromatic water-soluble compound | [L]/[M] | Reaction rate (%) | Viscosity (mPa·s) | Surface tension (dyne/cm) |
|---|---|---|---|---|---|---|---|
| Example | 3-1 | Lignin derivative (1) | PEOPH100 + PHB + ANS | 36/54 | 85 | 85.1 | 46.2 |
| | 3-2 | Lignin derivative (2) | PEOPH50 | 39/61 | 95 | 43.4 | 31.5 |
| | 3-3 | Lignin derivative (3) | PEOPH25 | 47/53 | 81 | 35.9 | 42.2 |
| | 3-4 | Lignin derivative (4) | PPOPE130 + PHB | 18/82 | 88 | 55.7 | 28.7 |
| | 3-5 | Lignin derivative (5) | PEOPH50 | 39/61 | 95 | 60.3 | 36.9 |
| | 3-6 | Lignin derivative (6) | PEOPH50 | 46/54 | 91 | 48.7 | 40.1 |
| | 3-7 | Lignin derivative (7) | PEOPH70 + PHB | 14/86 | 86 | 36.6 | 49.0 |
| | 3-8 | Lignin derivative (8) | PEOPH70 + ANS | 36/64 | 80 | 59.1 | 39.9 |
| | 3-9 | Lignin derivative (9) | PEOPH25 + NAP | 63/37 | 71 | 33.5 | 53.7 |
| | 3-10 | Lignin derivative (10) | PEOPH70 | 38/62 | 90 | 58.5 | 30.5 |
| Comparative Example | 3-1 | Lignin type dispersing agent (a) | — | 100/0 | — | 27.3 | 32.3 |
| | 3-2 | Lignin derivative (b) | — | — | — | 37.7 | 63.4 |
| | 3-3 | Aromatic water-soluble compound homopolymer (c) | PEOPH100 + PHB + ANS | — | 95 | 49.2 | 59.8 |
| | 3-4 | Naphthalene sulfonic acid type dispersing agent (d) | — | — | — | 9.4 | 71.3 |
| | 3-5 | Polycarboxylic acid type dispersing agent (e) | — | — | — | 10.7 | 67.2 |
| | 3-6 | Polycarboxylic acid type dispersing agent (f) | — | — | — | 9 | 59.2 |
| | 3-7 | Lignin derivative (11) | PEOPH50 | 39/61 | 38 | 26.9 | 35.3 |
| | 3-8 | Lignin derivative (12) | PEOPH50 | 20/80 | 63 | 41.3 | 62.0 |

Notes of Table 6:
PEOPH 100: poly(ethyleneoxide) mono phenyl ether (addition mole number of EO: 100)
PEOPH 50: poly(ethyleneoxide) mono phenyl ether (addition mole number of EO: 50)
PEOPH 25: poly(ethyleneoxide) mono phenyl ether (addition mole number of EO: 25)
PEOPH 70: poly(ethyleneoxide) mono phenyl ether (addition mole number of EO: 70)
PPOPH 130: poly(propyleneoxide) mono phenyl ether (addition mole number of PO: 130)
PHB: p-hydroxy benzoic acid
ANS: aniline sulfonic acid
NAP: naphthalene Examples 3-11 to 3-20 and Comparative Examples 3-9 to 3-16: Cement Composition Test The cement composition added with the sample of each of Examples 3-1 to 3-10 and Comparative Examples 3-1 to 3-8 was prepared by the procedure described below.

The rough aggregate, the fine aggregate, the cement and water which were blended as described in Table 7 (W/C=45%) and each sample with the amount (as a solid portion basis) described in Table 8 were charged at an ambient temperature (20° C.) into a forced biaxial mixer and mechanically kneaded for 90 seconds by means of the forced biaxial mixer to obtain a cement composition (each sample was charged as a mixture with water). The cement composition thus obtained was subject to the slump test, the air amount measurement, and the viscosity evaluation in accordance with the following procedure.

[Slump Test and Air Amount Measurement]

Immediately after the cement composition was discharged from the forced biaxial mixer, the fresh cement composition described below was subjected to the following tests. The test results thereof are summarized in Table 8.

Slump test: this was measured in accordance with JIS A 1101 (the drop distance from the peak of a fresh cement composition was measured as a slump value; and the spread width thereof was measured as a flow value).

Air amount measurement test: this was measured in accordance with JIS A 1128.

[Viscosity Evaluation of the Cement Composition]

This was evaluated in accordance with the following standard by the sensory evaluation done by 5 evaluators.

<Standard of Viscosity Evaluation>

A: Because a suitable viscosity is given to the cement composition, substantially there is no bleeding observed.

B: Although the viscosity is given to the cement composition, there are some bleedings observed.

C: Not only the viscosity is not given to the cement composition, but also there is a large bleeding observed.

TABLE 7

| W/C | Unit weight (kg/m³) | | | | |
|---|---|---|---|---|---|
| (%) | W | C | S1 | S2 | G |
| 45 | 180 | 400 | 433 | 429 | 878 |

Notes of Table 7:

C: Equal amounts of the following 3 cements were mixed.

Normal Portland cement (specific gravity of 3.16: manufactured by Ube-Mitsubishi Cement Corp.)

Normal Portland cement (specific gravity of 3.16: manufactured by Taiheiyo Cement Corp.)

Normal Portland cement (specific gravity of 3.16: manufactured by Tokuyama Corp.)

W: Tapped water

S1: Mountain sand originated from Kakegawa (fine aggregate with specific gravity of 2.57)

S2: Sand of crushed stone originated from Iwase (fine aggregate with specific gravity of 2.61)

G: Crushed stone originated from One (rough aggregate with specific gravity of 2.65)

TABLE 8

|  |  | Cement dispersing agent | Addition amount (% by weight) | SL value (cm) | Air amount (% by weight) | Viscosity |
|---|---|---|---|---|---|---|
| Example | 3-11 | Lignin derivative (1) | 0.2 | 15.1 | 1.4 | A |
|  | 3-12 | Lignin derivative (2) | 0.2 | 16.7 | 1.2 | A |
|  | 3-13 | Lignin derivative (3) | 0.2 | 14.2 | 1.2 | A |
|  | 3-14 | Lignin derivative (4) | 0.2 | 14.2 | 0.8 | A |
|  | 3-15 | Lignin derivative (5) | 0.2 | 14.8 | 0.9 | A |
|  | 3-16 | Lignin derivative (6) | 0.2 | 14.0 | 1.7 | B |
|  | 3-17 | Lignin derivative (7) | 0.2 | 15.8 | 1.3 | B |
|  | 3-18 | Lignin derivative (8) | 0.2 | 15.9 | 1.4 | A |
|  | 3-19 | Lignin derivative (9) | 0.2 | 14.4 | 1.5 | B |
|  | 3-20 | Lignin derivative (10) | 0.2 | 16.5 | 1.0 | A |
| Comparative Example | 3-9 | Lignin type dispersing agent (a) | 0.2 | 2.1 | 3.8 | C |
|  |  |  | 0.6 | 7.2 | 6.2 | C |
|  | 3-10 | Lignin derivative (b) | 0.2 | 3.7 | 0.9 | C |
|  |  |  | 0.6 | 10.6 | 4.2 | C |
|  | 3-11 | Aromatic water-soluble compound homopolymer (c) | 0.2 | 1.8 | 1.4 | C |
|  |  |  | 0.6 | 8.8 | 6.5 | B |
|  | 3-12 | Naphthalene sulfonic acid type dispersing agent (d) | 0.2 | 8.5 | 1.8 | C |
|  |  |  | 0.6 | 15.0 | 5.8 | C |
|  | 3-13 | Polycarboxylic acid type dispersing agent (e) | 0.2 | 16.5 | 1.1 | C |
|  | 3-14 | Polycarboxylic acid type dispersing agent (f) | 0.2 | 14.9 | 1.5 | C |
|  | 3-15 | Lignin derivative (11) | 0.2 | 2.5 | 2.6 | C |
|  | 3-16 | Lignin derivative (12) | 0.2 | 6.0 | 6.9 | B |

Notes of Table 8:
Addition rate (% by mass): Addition rate of the solid portion in the cement dispersing agent relative to 100% by mass of the cement composition
SL: Slump value (cm)

From Table 8, the following points are clear. When the flow values of the mortars obtained by using the lignin derivatives (1) to (10) were compared with the mortar obtained by using the polycarboxylic acid type dispersing agent (e) at the same addition rate, the slump values of them were almost the same, although part of the lignin derivatives exhibited a higher slump value than the polycarboxylic acid type dispersing agent (e). When the lignin derivative (a) or the lignin derivative (b) in Comparative Examples is compared with the lignin derivatives (1) to (10), the latter derivatives exhibited eminently higher slump values. From this, it can be seen that the dispersing agent according to the present invention that contains the lignin derivative has a high dispersing performance, and also it can be understood that when the addition mole number of the alkylene oxide is 25 or more and the reaction rate of the aromatic water-soluble compound is high, a further higher dispersibility can be expressed.

When the lignin derivative (2) of Example 3-12 is compared with the lignin derivative (11) of Comparative Example 3-15, it can be clearly seen that the slump value in Example 3-12 is higher. In the lignin derivative (2), the reaction rate of the lignin sulfonic acid-based compound and the aromatic water-soluble compound is as high as 95%; on the other hand, in the lignin derivative (11), the reaction rate thereof is as low as 38%. Accordingly, in the lignin derivative according to the present invention, it is clear that because the lignin sulfonic acid-based compound and the aromatic water-soluble monomer are reacted with a high reaction rate, the viscosity and the surface tension of the lignin derivative obtained from this reaction are within the prescribed range thereby exhibiting the performance thereof.

In addition, in the lignin derivatives (1) to (10), the air amounts are significantly lower than the air amount in the conventional lignin derivative (a). Therefore, it is clear that a high air entraining property, which is a drawback of the lignin-based dispersing agent, can be suppressed.

In addition, in the lignin derivatives (1) to (10), it can be seen that not only the concrete viscosity can be significantly improved but also the state of the concrete is superior, as compared not only with the conventional lignin type derivative (a) but also with the polycarboxylic acid type water reducing agent (e).

Examples 3-21 to 3-30 and Comparative Examples 3-17 to 3-24: Gypsum Composition Test The dispersibilities in the gypsum composition using the samples of Examples 3-1 to 3-10 and Comparative Examples 3-1 to 3-8 were compared. The dispersion flow and the hardening time that are described in Table 9 were evaluated as follows.

[Dispersion Flow (mm) of Gypsum]

The liquid product (110 g; water as the solvent) including the sample with the addition amount as a solid portion basis (% by weight relative to the gypsum composition) as described in Table 9 was mixed with 71.5 g of Gypsum SK (manufactured by Mutsumi Chemical Industries Co., Ltd.), and then, the resulting mixture was agitated with an agitator at the rotation number of 600 rpm for 20 seconds. Immediately after this, the slurry thereof was poured into a flow measuring pillar pipe (the inner diameter of 40 mm and the height of 50 mm) placed on a glass plate; and then, the pillar pipe was pulled out to measure the flow values of the slurry at two different points. The average value thereof was taken as the dispersion flow.

[Hardening Time (Minute) of Gypsum]

This was measured in accordance with JIS R 9112:2015 (physical testing method of pottery molding gypsum) by using a Vicat needle setting time measurement instrument. The hardening time is the time until a standard needle of the instrument stops at the depth of 1 mm from the sample surface.

[B Type Viscosity (mPa·s) of Gypsum]

The gypsum composition was prepared with the same test condition as that of the dispersion flow; and the viscosity of the gypsum immediately after agitation was measured by using a B type viscometer (BL type; manufactured by Toki Sangyo Co., Ltd.) under the condition of 20° C. and 60 rpm using the #2 rotor or the #3 rotor.

TABLE 9

|  |  | Gypsum dispersing agent | Addition amount (% by weight) | Dispersion flow (mm) | curing time (min) | B type viscosity (mPa · s) |
|---|---|---|---|---|---|---|
| Example | 3-21 | Lignin derivative (1) | 0.1 | 170 | 7.5 | 1,500 |
|  | 3-22 | Lignin derivative (2) | 0.1 | 168 | 8.0 | 1,100 |
|  | 3-23 | Lignin derivative (3) | 0.1 | 173 | 8.0 | 1,200 |
|  | 3-24 | Lignin derivative (4) | 0.1 | 163 | 8.5 | 1,400 |
|  | 3-25 | Lignin derivative (5) | 0.1 | 174 | 8.0 | 1,100 |
|  | 3-26 | Lignin derivative (6) | 0.1 | 177 | 7.5 | 800 |
|  | 3-27 | Lignin derivative (7) | 0.1 | 166 | 8.0 | 1,000 |
|  | 3-28 | Lignin derivative (8) | 0.1 | 169 | 7.5 | 1,900 |
|  | 3-29 | Lignin derivative (9) | 0.1 | 173 | 7.5 | 1,000 |
|  | 3-30 | Lignin derivative (10) | 0.1 | 168 | 8.0 | 1,200 |
| Comparative Example | 3-17 | Lignin type dispersing agent (a) | 0.1 | 153 | 9.0 | 2,900 |
|  |  |  | 0.2 | 161 | 10.0 | 2,300 |
|  | 3-18 | Lignin derivative (b) | 0.1 | 157 | 9.0 | 2,500 |
|  |  |  | 0.2 | 164 | 10.5 | 2,000 |
|  | 3-19 | Aromatic water-soluble compound homopolymer (c) | 0.1 | 149 | 8.5 | 2,500 |
|  |  |  | 0.2 | 160 | 9.0 | 2,200 |
|  | 3-20 | Naphthalene sulfonic acid type dispersing agent (d) | 0.05 | 164 | 7.0 | 2,700 |
|  |  |  | 0.1 | 169 | 7.5 | 2,100 |
|  | 3-21 | Polycarboxylic acid type dispersing agent (e) | 0.05 | 167 | 8.5 | 1,400 |
|  |  |  | 0.1 | 182 | 9.0 | 1,100 |
|  | 3-22 | Polycarboxylic acid type dispersing agent (f) | 0.05 | 160 | 8.0 | 1,800 |
|  |  |  | 0.1 | 174 | 8.5 | 1,500 |
|  | 3-23 | Lignin derivative (11) | 0.1 | 161 | 9.0 | 1,800 |
|  | 3-24 | Lignin derivative (12) | 0.1 | 164 | 8.5 | 1,700 |

As can be clearly seen in Table 9, in the lignin derivative of every Example, as compared with the lignin-based dispersing agent (a), the dispersion flow was higher, the hardening time was shorter, and the B type viscosity was lower. When compared with the existing naphthalene sulfonic acid type dispersing agent (d), the dispersion flow was almost the same, and the hardening time was almost the same; on the other hand, the B type viscosity was lower. When compared with the polycarboxylic acid type dispersing agents (e) to (f), the dispersion flow was lower; on the other hand, the hardening time was shorter, and the B type viscosity was lower. When compared with the lignin derivatives (11) to (12), the dispersion flow was higher, and the hardening time was shorter.

From the above results, it can be seen that with a small addition amount to the gypsum composition, the lignin derivative of every Example can not only give the dispersibility to the gypsum composition, but also shorten the hardening time and lower the viscosity of the gypsum composition. These characteristics can contribute to enhancement in the production efficiency of the gypsum composition and enhancement in the filling property of the gypsum into the frame.

The invention claimed is:

1. A liquid composition, comprising:
a lignin sulfonic acid-based compound;
an aromatic water-soluble compound; and
a reaction product of the lignin sulfonic acid-based compound with the aromatic water-soluble compound,
wherein a peak area ratio represented by the following formula is at least 70%, $([b]-[a])/[b]$, wherein [b] is a gel permeation chromatography (GPC) peak area, at detection wavelength of 280 nm, of the aromatic water-soluble compound before the reaction and [a] is a GPC peak area of the aromatic water soluble compound after the reaction; and
when the liquid composition is dried using a fan dryer at 100° C. for 24 hours to obtain a nonvolatile content, and dissolving the nonvolatile content in water to obtain a first aqueous solution in which a concentration of the nonvolatile content is from 28 to 32% by mass, a B type viscosity of the first aqueous solution is from 30 to 100 mPa·s.

2. The liquid composition of claim 1, wherein the reaction product comprises an anionic functional group.

3. The liquid composition of claim 2, wherein the reaction product comprises a polyalkylene oxide chain having an average addition ole number of alkylene oxide of at least 25.

4. The liquid composition of claim 2, wherein the liquid composition is obtained by reacting the lignin sulfonic acid-based compound [L] with the aromatic water-soluble compound [M] at an [L]/[M] reaction weight ratio of from 1 to 99/99 to 1.

5. The liquid composition of claim 1, wherein the aromatic water-soluble compound comprises a polyalkylene oxide chain, a carboxy group, and/or a sulfo group.

6. The liquid composition of claim 1, wherein the reaction rate of the aromatic water-soluble compound with the lignin sulfonic acid-based compound is at least 80%.

7. A dispersing agent comprising the liquid composition of claim 1.

8. The dispersing agent of claim 7, which is suitable for oil field drilling mud or for a hydraulic composition.

9. The liquid composition of claim 1, wherein when the nonvolatile content is dissolved in water to obtain a second aqueous solution in which a concentration of the nonvolatile content is in a range of from 8 to 12% by mass, a surface tension of the second aqueous solution is in a range of from 25 to 55 dyne/cm.

10. A hydraulic composition, comprising:
a hydraulic material; and
the dispersing agent of claim 7.

11. The hydraulic composition of claim 10, which is a cement composition or a gypsum composition.

12. A method for producing the liquid composition of claim 1, the method comprising:
reacting the lignin sulfonic acid-based compound with the aromatic water-soluble compound.

13. A method for producing a composition, the method comprising:
preparing the liquid composition of claim 1; and
drying the liquid composition, thereby obtaining a dried solid product, wherein
the dried solid product satisfies following conditions (A) and (B) and is a granular product:
condition (A): an average particle diameter is in a range of 30 to 250 μm; and
condition (B): in a particle size distribution, an accumulated area of a particle diameter of 100 μm or less is 15.0% or more.

14. The liquid composition of claim 1, wherein the reaction rate is a mass ratio of the aromatic water-soluble compound forming the reaction product, with respect to a total of the aromatic water-soluble compound forming the reaction product and the aromatic water-soluble compound included in the liquid composition as a separate component from the reaction product.

* * * * *

UNITED STATES PATENT AND TRADEMARK OFFICE
CERTIFICATE OF CORRECTION

| | |
|---|---|
| PATENT NO. | : 11,873,443 B2 |
| APPLICATION NO. | : 17/265399 |
| DATED | : January 16, 2024 |
| INVENTOR(S) | : Akihiko Nakamura et al. |

It is certified that error appears in the above-identified patent and that said Letters Patent is hereby corrected as shown below:

In the Claims

Column 52, Line 44, Claim 3, "ole number" should read -- mole number --.

Signed and Sealed this
Thirteenth Day of February, 2024

Katherine Kelly Vidal
*Director of the United States Patent and Trademark Office*